(12) United States Patent
Wagatsuma

(10) Patent No.: US 9,619,737 B2
(45) Date of Patent: Apr. 11, 2017

(54) DISPLAY APPARATUS, DISPLAY METHOD, AND COMPUTER READABLE RECORDING MEDIUM STORED WITH DISPLAY PROGRAM

(71) Applicant: KONICA MINOLTA, INC., Tokyo (JP)

(72) Inventor: Yoshifumi Wagatsuma, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/807,830

(22) Filed: Jul. 23, 2015

(65) Prior Publication Data

US 2016/0055401 A1 Feb. 25, 2016

(30) Foreign Application Priority Data

Aug. 21, 2014 (JP) .................. 2014-168820

(51) Int. Cl.
*G06K 15/00* (2006.01)
*G03G 15/00* (2006.01)
*G06F 3/048* (2013.01)

(52) U.S. Cl.
CPC .......... *G06K 15/002* (2013.01); *G03G 15/50* (2013.01); *G03G 15/502* (2013.01); *G06F 3/048* (2013.01); *G03G 2215/00126* (2013.01)

(58) Field of Classification Search
CPC .................................................. G06K 15/002
(Continued)

(56) References Cited

U.S. PATENT DOCUMENTS

2008/0098021 A1 4/2008 Harada et al.
2009/0064002 A1* 3/2009 Katsumata ........... G03G 15/502
715/762
(Continued)

FOREIGN PATENT DOCUMENTS

JP H09-205292 A 8/1997
JP P2008-107979 A 5/2008
(Continued)

OTHER PUBLICATIONS

Notice of Reason for Refusal dated Nov. 1, 2016 for JP Application No. 2014-168820 with English translation; total of 6 pages.

*Primary Examiner* — Jacky X Zheng
(74) *Attorney, Agent, or Firm* — Squire Patton Boggs (US) LLP

(57) ABSTRACT

A display apparatus that switches and displays a plurality of operation screens each including an operation object selectable by an operator and having a layered structure includes a storage unit which stores information on guidance of prompting an operator to select a predetermined operation object, a recognizing unit which recognizes that an operation object is added or deleted, and an update unit which updates information on guidance in response to a relation between an operation screen to/from which the operation object is added or deleted and an operation screen positioned higher or lower than the operation screen such that content of the guidance provided on the basis of the information reflects configurations of the plurality of operation screens after addition or deletion of the operation object, when the operation object is added or deleted.

19 Claims, 24 Drawing Sheets

(58) Field of Classification Search
USPC .......................................................... 358/1.15
See application file for complete search history.

(56) References Cited

U.S. PATENT DOCUMENTS

| | | | | |
|---|---|---|---|---|
| 2012/0147405 A1* | 6/2012 | Suzuki | ................. | G03G 15/502 |
| | | | | 358/1.13 |
| 2015/0116769 A1* | 4/2015 | Nakagawa | ............ | G06F 3/0488 |
| | | | | 358/1.15 |
| 2015/0319319 A1* | 11/2015 | Maeda | ............... | H04N 1/00411 |
| | | | | 358/1.13 |

FOREIGN PATENT DOCUMENTS

| | | |
|---|---|---|
| JP | 2009-230230 | 10/2009 |
| JP | 2011-078032 | 4/2011 |
| WO | WO 97/17827 A1 | 5/1997 |

\* cited by examiner

FIG.3
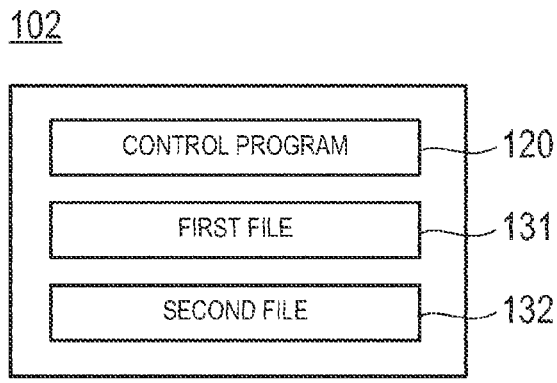
FIG.4A
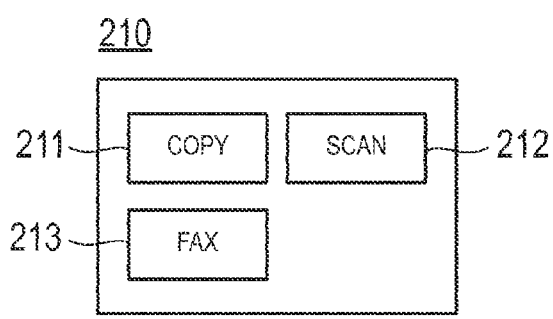
FIG.4B
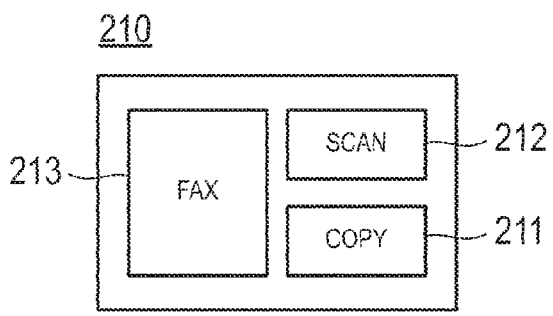

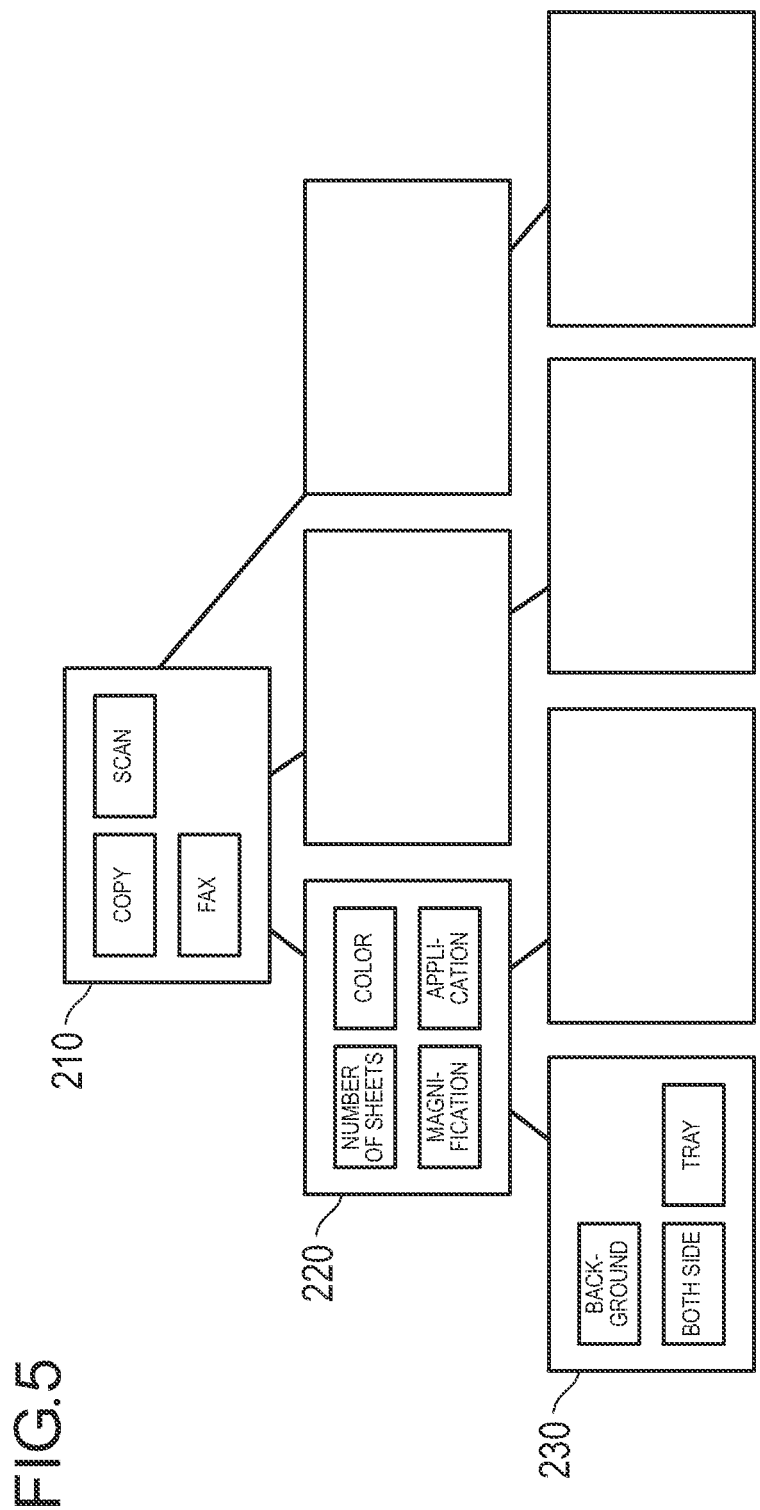

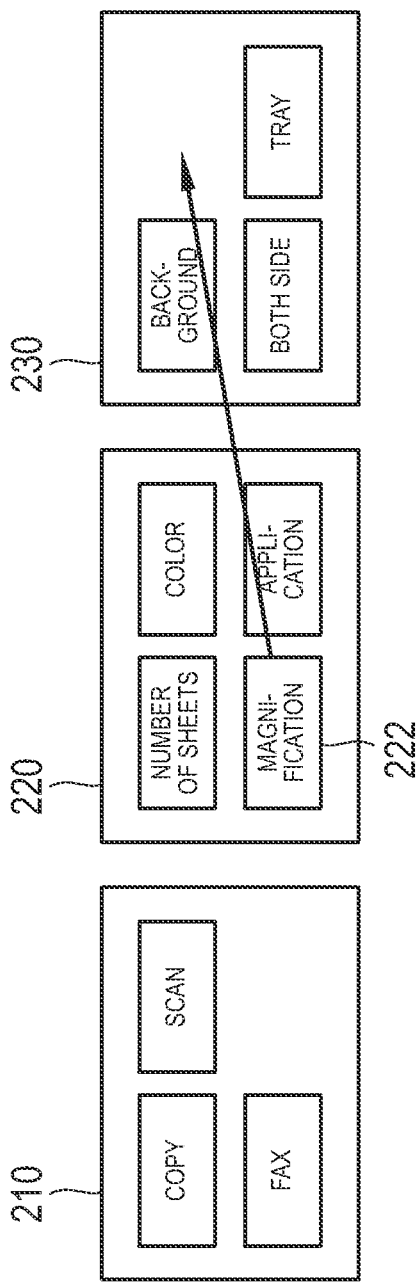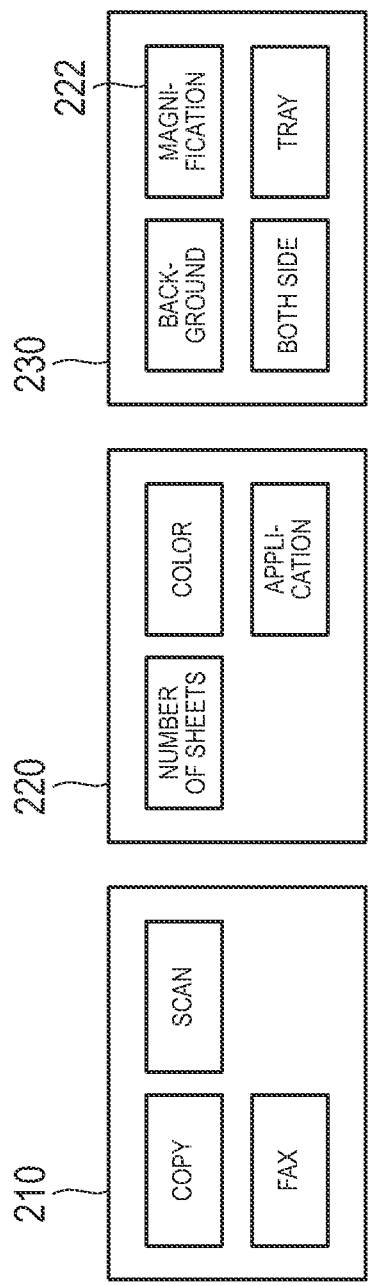

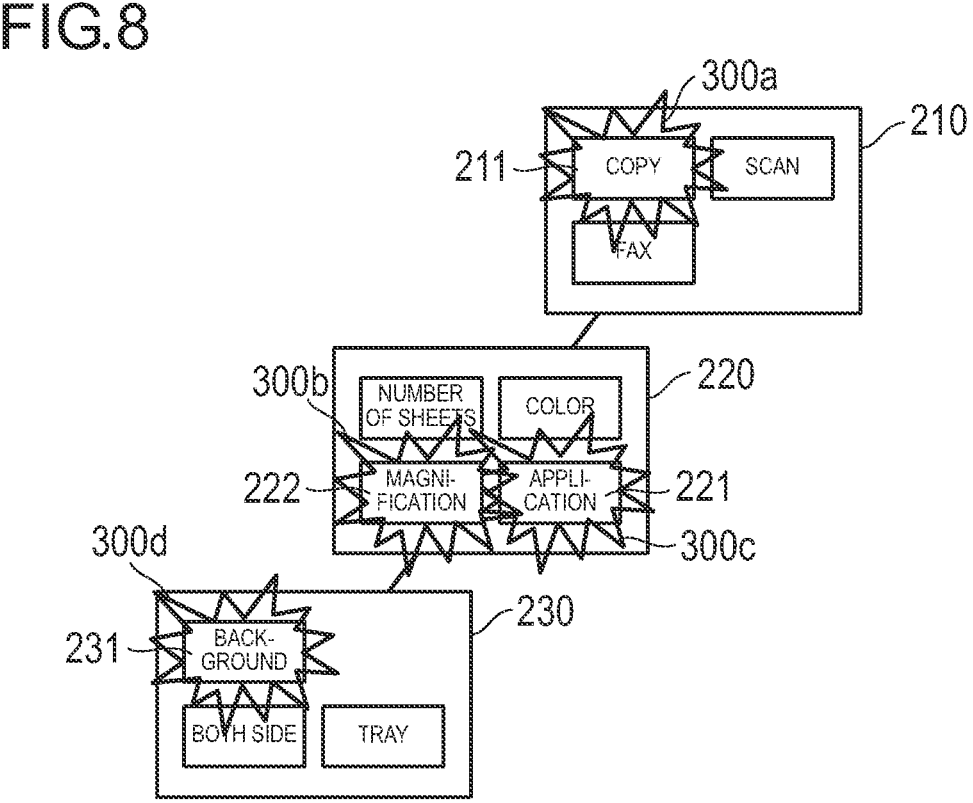

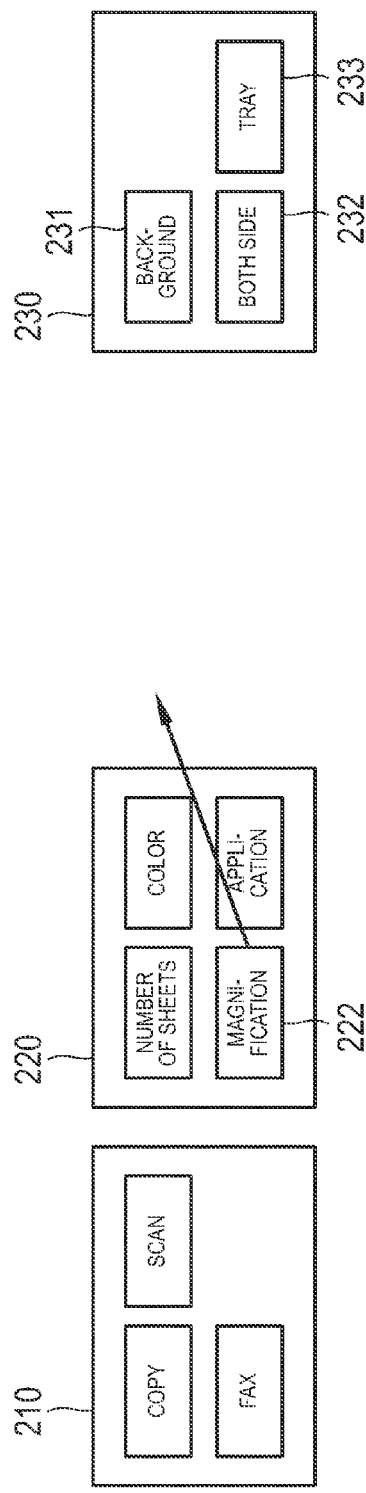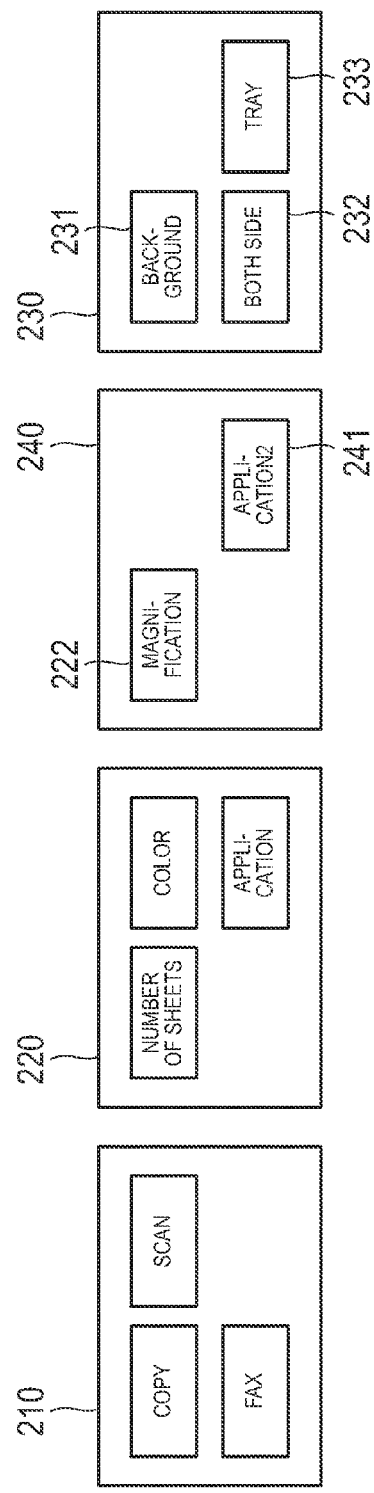

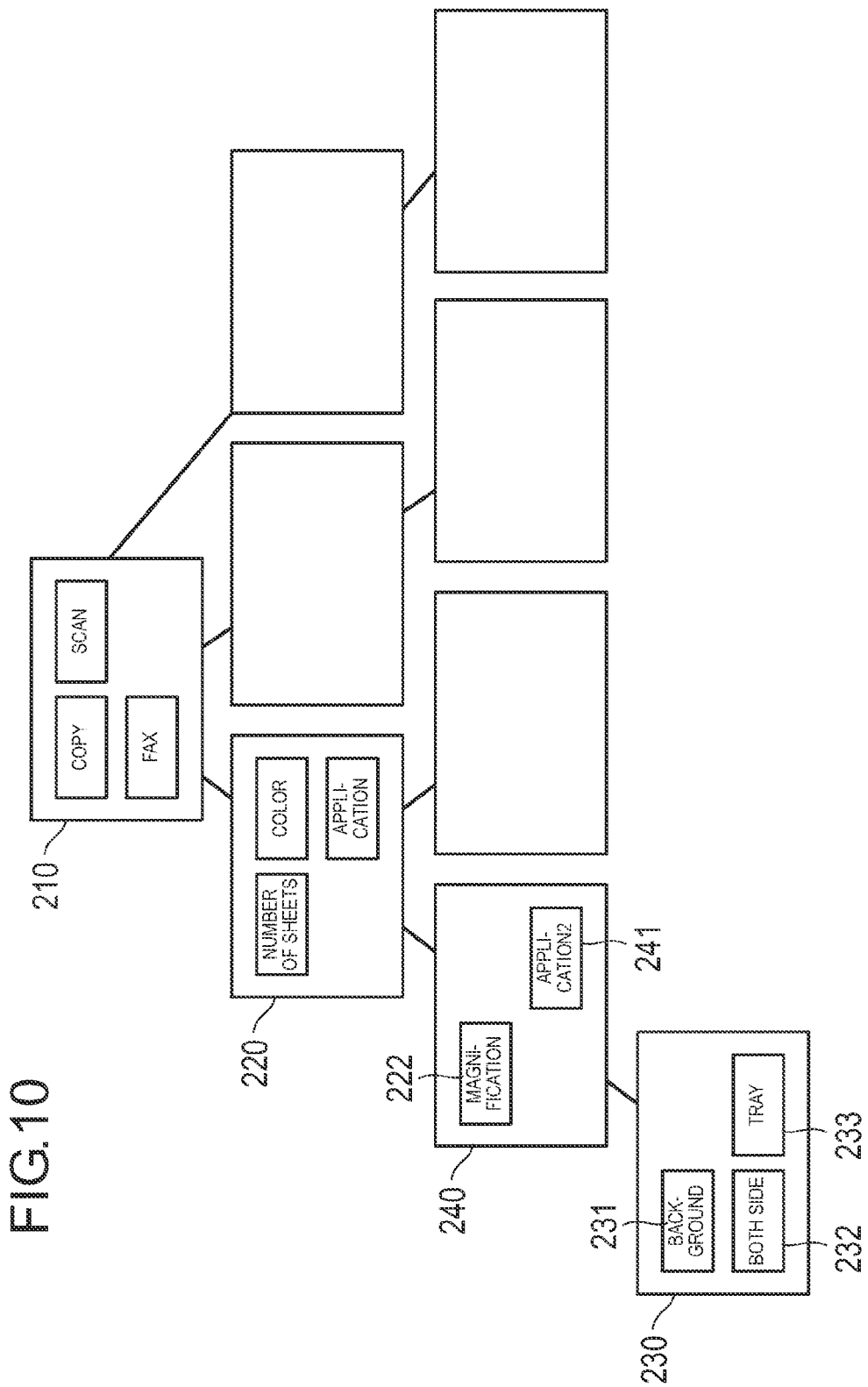

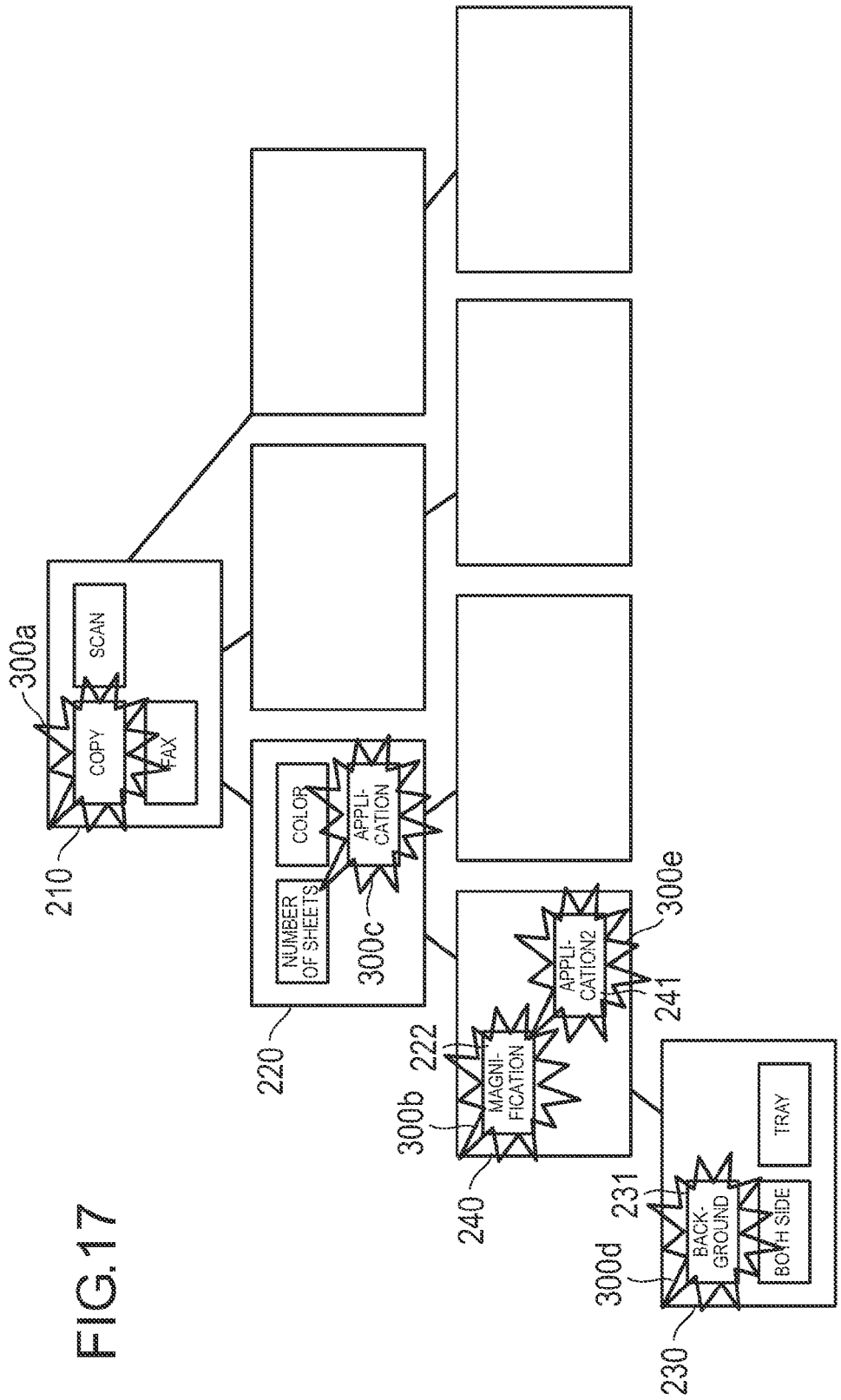

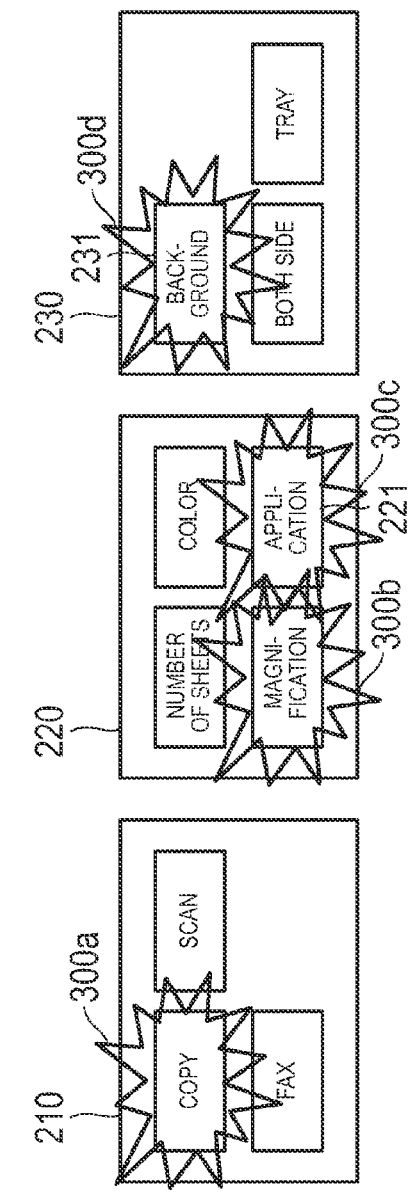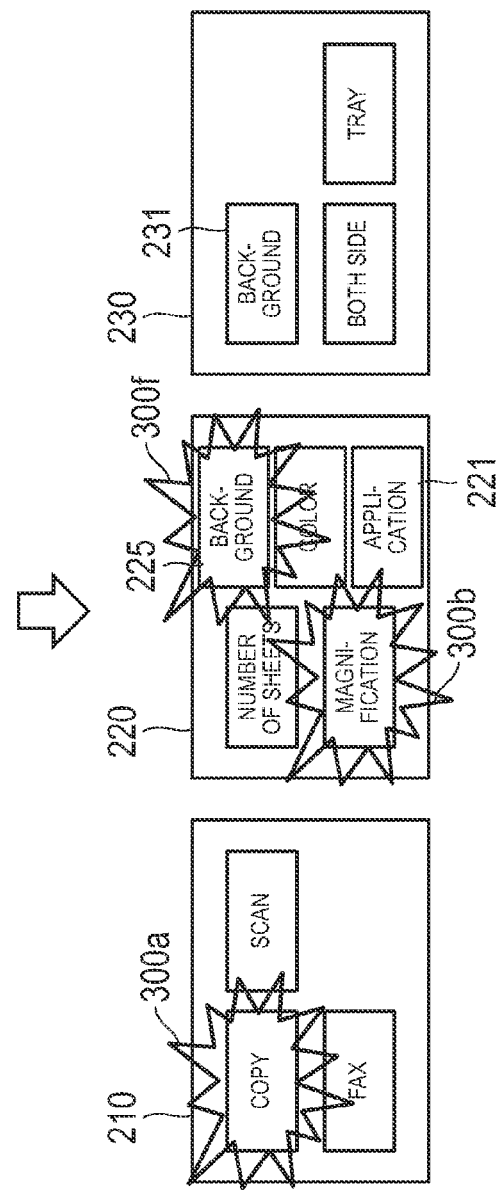

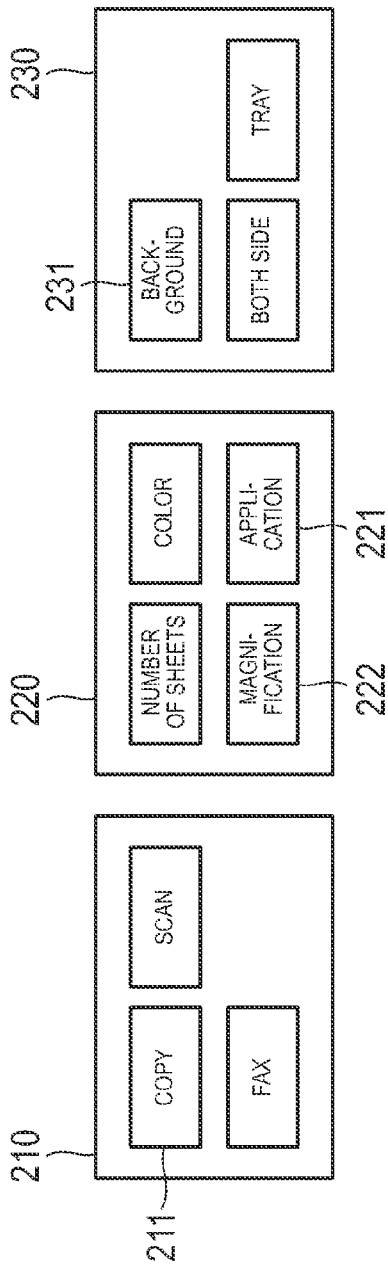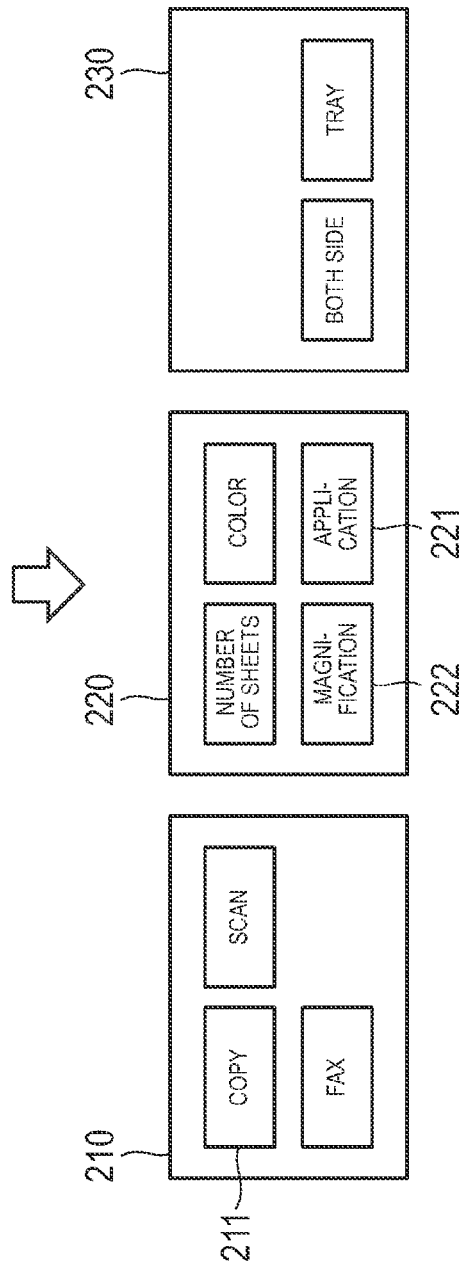

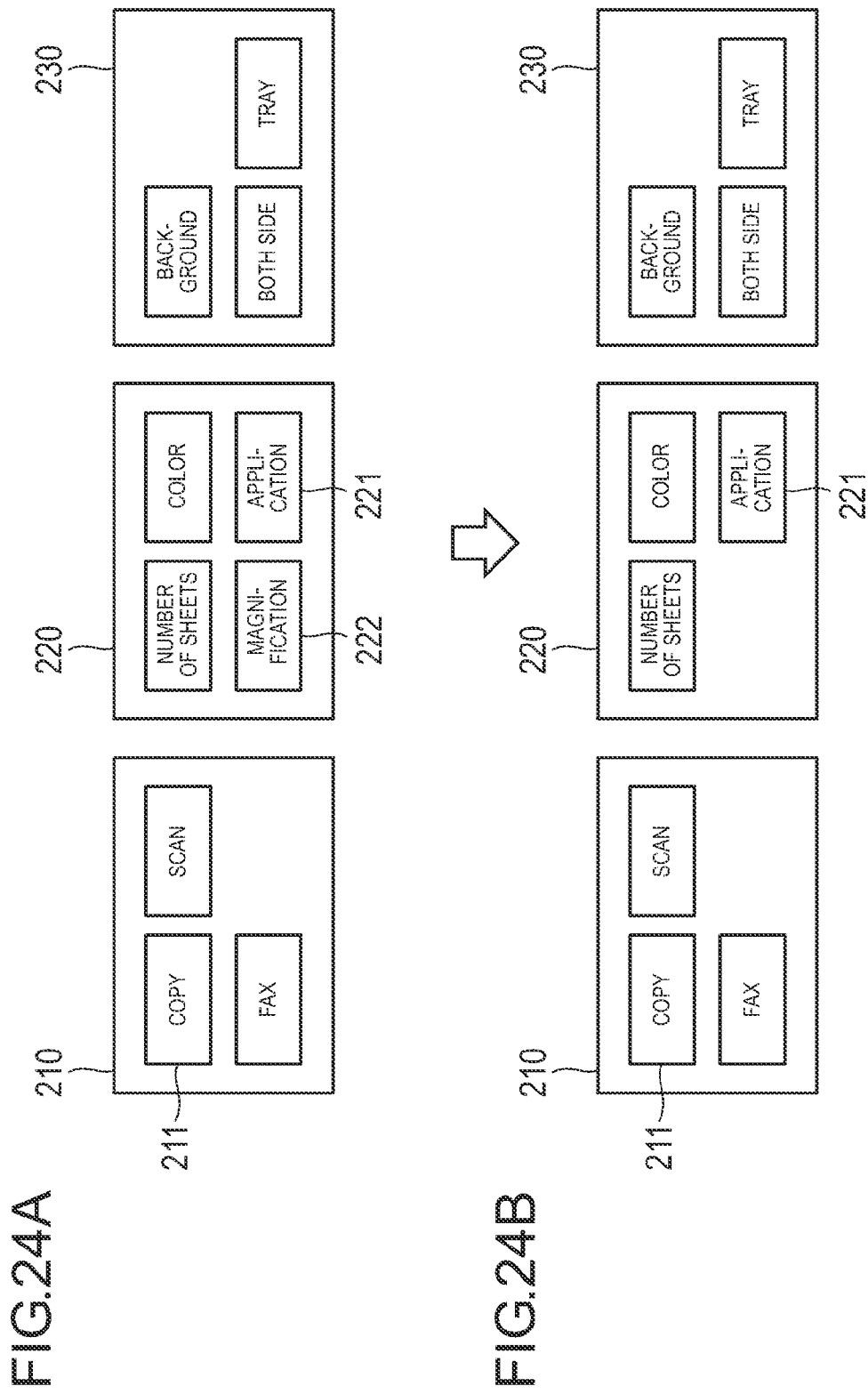

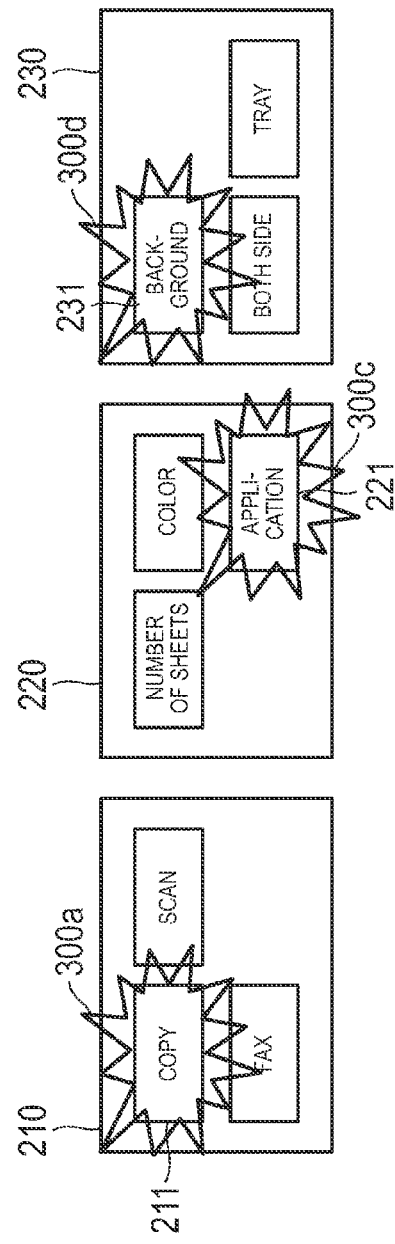
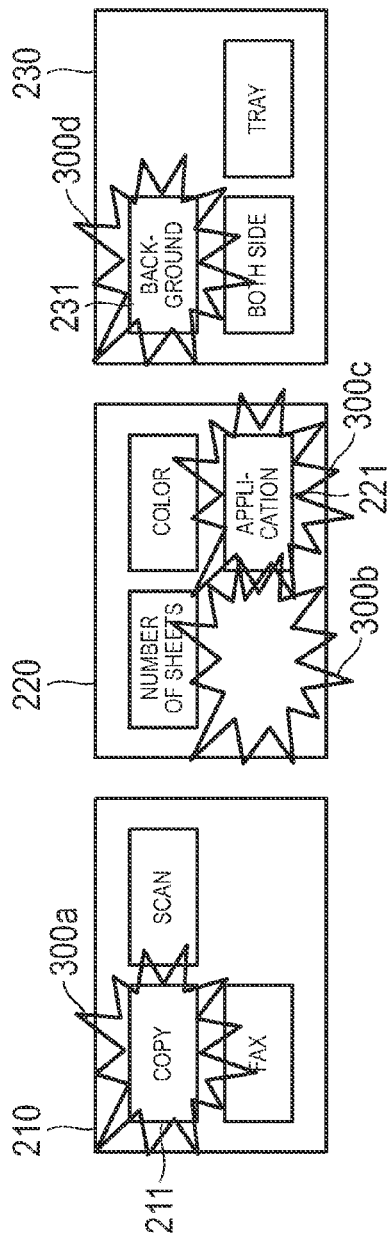
FIG.25A
FIG.25B

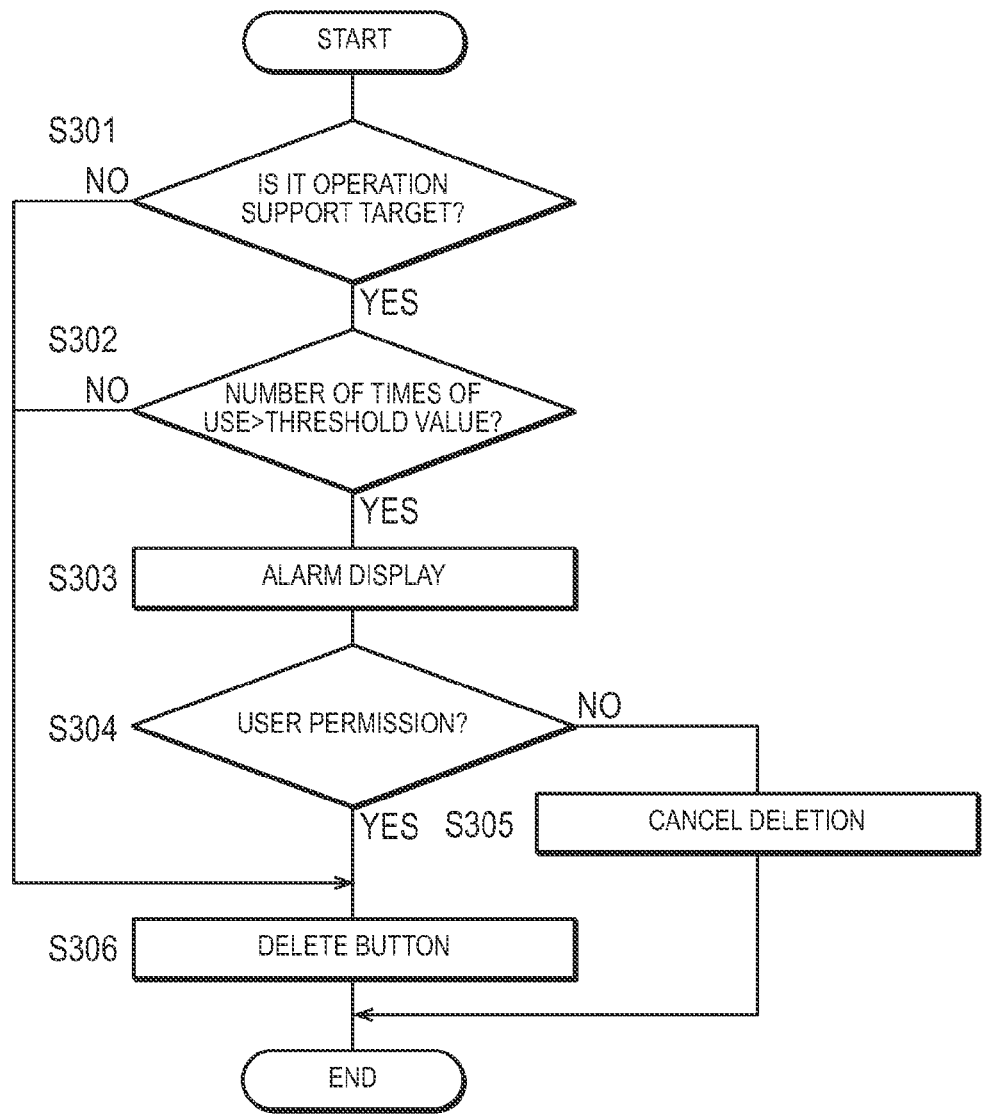

DISPLAY APPARATUS, DISPLAY METHOD, AND COMPUTER READABLE RECORDING MEDIUM STORED WITH DISPLAY PROGRAM

CROSS-REFERENCE TO RELATED APPLICATION

This application is based on Japanese Patent Application No. 2014-168820 filed on Aug. 21, 2014, the contents of which are incorporated herein by reference.

BACKGROUND

1. Technical Field

The present invention relates to a display apparatus, a display method, and a computer readable recording medium stored with a display program.

2. Description of Related Art

An image forming apparatus such as MFP (Multi-Function Peripheral) has a guidance function of teaching a button operation required for setting predetermined image forming conditions to an operator. The image forming apparatus emphasizes an operation button, which is required for setting the predetermined image forming conditions, among a plurality of operation buttons on an operation screen displayed on an operation panel, by using another image for example, and prompts the operator to press the operation button.

In relation to this, Japanese Unexamined Patent Publication No. 2009-230230 discloses a technology in which, when the position of an operation button on an operation screen has been changed by customization of the operation screen, the position of another image for emphasizing the operation button is changed according to the change in the position of the operation button. According to this technology, although the position of the operation button has been changed by the customization of the operation screen, a necessary operation button is correctly emphasized, so that it is possible to provide correct guidance.

Meanwhile, an operation screen displayed on an operation panel has a layered structure, and one operation screen of a plurality of operation screens is displayed on the operation panel. In a plurality of operation screens having a layered structure, when an operation screen is newly created by customization of an operation screen and an operation button is moved onto the operation screen, a new operation button is sometimes added to the operation screen. Furthermore, in a plurality of operation screens having a layered structure, for example, in order to reduce the number of operation screens, an operation button is deleted (for example, Japanese Unexamined Patent Publication No. 2011-078032).

However, the technology of Japanese Unexamined Patent Publication No. 2009-230230 does not consider the treatment of a guidance function when an operation button is added or deleted with respect to a plurality of operation screens having a layered structure.

SUMMARY

The present invention has been accomplished in view of the above problem. Accordingly, objectives of the present invention are to provide a display apparatus, a display method, and a computer readable recording medium stored with a display program, by which it is possible to provide correct guidance when an operation object such as an operation button has been added or deleted with respect to a plurality of operation screens having a layered structure.

To achieve at least one of the aforementioned objectives, a display apparatus reflecting one aspect of the present invention is a display apparatus that switches and displays a plurality of operation screens each including an operation object selectable by an operator and having a layered structure and includes: a display unit configured to display one operation screen of the plurality of operation screens; a storage unit configured to store information on guidance of prompting an operator to select a predetermined operation object; a recognizing unit configured to recognize that an operation object is added or deleted; and an update unit configured to update the information in response to a relation between an operation screen to/from which the operation object is added or deleted and an operation screen positioned higher or lower than the operation screen such that content of the guidance provided on a basis of the information reflects configurations of the plurality of operation screens after addition or deletion of the operation object, when the operation object is added or deleted.

Preferably, in the display apparatus, the update unit updates the information, after deleting an operation screen having no relation to the content of the guidance sequentially from an lowermost operation screen of the plurality of operation screens having a layered structure to extract a series of operation screens including the operation screen to/from which the operation object is added or deleted from the plurality of operation screens.

Preferably, the display apparatus further includes a checking unit configured to prompt the operator to check, when deletion of an operation object, which the operator is prompted to select in the guidance, is instructed by the operator.

Preferably, the display apparatus further includes a determination unit configured to determine whether to prompt the operator to check in response to an operation history of the operation object.

Preferably, in the display apparatus, the determination unit determines whether to prompt the operator to check, by comparing the operation history with a predetermined threshold value, and the display apparatus further includes a changing unit configured to change the threshold value.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 3 is a block diagram showing the storage content of a storage unit of an image forming apparatus.

FIGS. 4A and 4B are diagrams each showing an example of an operation screen displayed on an operation panel of an image forming apparatus.

FIG. 5 is a diagram for explaining a layered structure of an operation screen.

FIGS. 7A and 7B are diagrams for explaining customization of an operation screen.

FIG. 8 is a diagram for explaining a guidance function of an image forming apparatus.

FIGS. 9A and 9B are diagrams showing an example of customization in which an operation button is added.

FIG. 10 is a diagram showing a layered structure of an operation screen after customization.

FIG. 17 is a diagram for explaining an update process of a second step.

FIGS. 20A and 20B are diagrams showing guidance provided by a second file.

FIGS. 22A and 22B are diagrams showing an example of customization in which an operation button is deleted.

FIGS. 24A and 24B are diagrams showing another example of customization in which an operation button is deleted.

FIGS. 25A and 25B are diagrams showing guidance provided by a second file.

FIG. 26 is a flowchart showing the procedure of a checking process according to a modification.

DETAILED DESCRIPTION

Hereinafter, the embodiments of the present invention will be described in detail with reference to the drawings.

Figure 1:
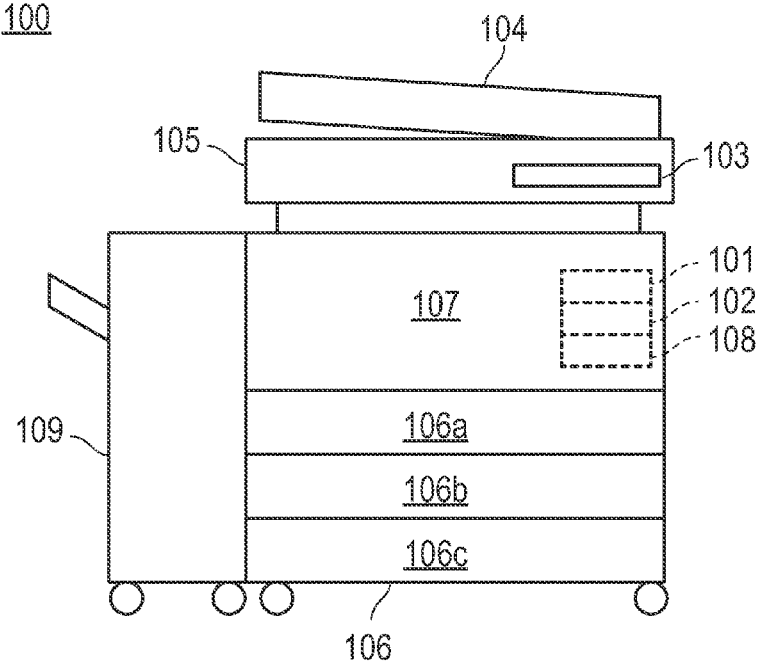
FIG. 1 is a schematic front view showing the configuration of an image forming apparatus to which a display apparatus according to an embodiment of the present invention is applied.
Figure 2:
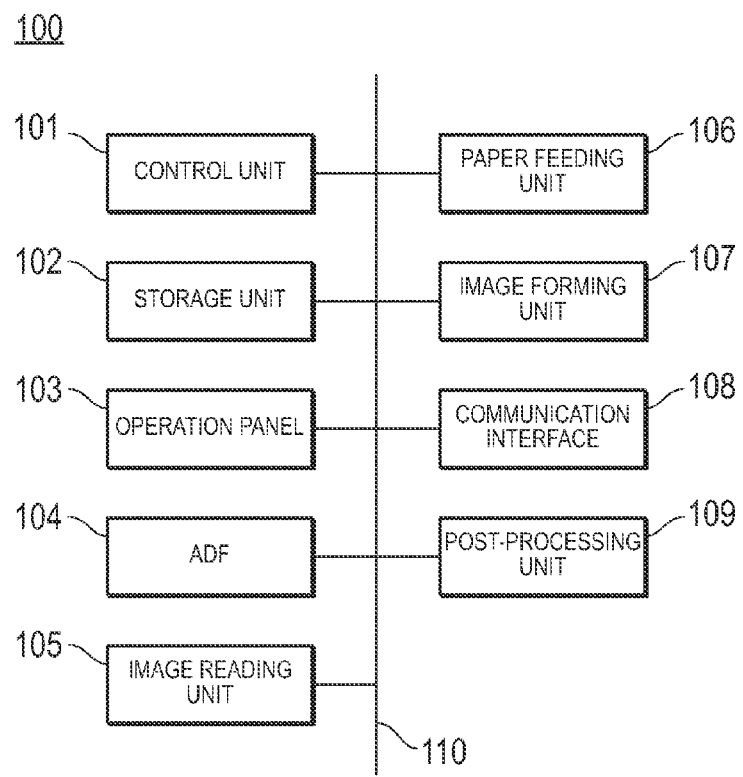
FIG. 2 is a block diagram showing the configuration of an image forming apparatus.

FIG. 1 is a schematic front view showing the configuration of an image forming apparatus 100 to which a display apparatus according to an embodiment of the present invention is applied, and FIG. 2 is a block diagram showing the configuration of the image forming apparatus 100.

As shown in FIGS. 1 and 2, the image forming apparatus 100 includes a control unit 101, a storage unit 102, an operation panel 103, an ADF (Auto Document Feeder) 104, an image reading unit 105, a paper feeding unit 106, an image forming unit 107, a communication interface 108, and a post-processing unit 109, and these elements are connected to one another via a bus 110 for exchanging signals.

The control unit 101 is CPU (Central Processing Unit) and performs control of each element and various calculation processes in accordance with a program. The storage unit 102 includes ROM (Read Only Memory) for storing various programs and various pieces of data in advance, RAM (Random Access Memory) for temporarily storing a program and data as a work area, a hard disk for storing various programs for controlling a basic operation of the image forming apparatus 100 and various pieces of data, and the like.

The operation panel 103 includes a touch panel, a numeric keypad, a start button, a stop button, and the like, and is used for the display of various types of information and the input of various instructions. The operation panel 103 serves as a display unit and displays one operation screen of a plurality of operation screens having a layered structure.

The ADF 104 transports a plurality of sheets of documents that are set, to a predetermined reading position of the image reading unit 105, sequentially, one sheet at a time, and discharges the documents after image reading.

The image reading unit 105 illuminates the document that is set in a predetermined reading position or document that is transported to a predetermined reading position by the ADF 104, by a light source such as a fluorescent lamp, performs an opto-electronic conversion of the reflected light by an imaging device such as a CCD (Charge Coupled Device) image sensor, and generates image data from the electrical signals.

The paper feeding units 106a to 106c accommodate recording sheets such as papers to be used in printing. The paper feeding unit 106 (the generic term of the paper feeding units 106a to 106c) sends the accommodated papers to the image forming unit 107, one sheet at a time.

The image forming unit 107 prints an image based on various pieces of data on the recording sheet such as a paper by using a well-known imaging process such as an electro-photographic process including each process of electrical charging, exposure, developing, transferring, and fixing.

The communication interface 108 is an interface for communicating with another device, and a standard such as Ethernet, FDDI (Fiber Distributed Data Interface), and Wi-Fi (Wireless Fidelity) is used.

The post-processing unit 109 performs a finishing process to be performed on a printed paper transferred from the image forming unit 107. The finishing process includes a punching process for punching a hole for filing in an end portion of a paper and a folding process for folding a paper from a center portion thereof.

In addition, the image forming apparatus 100 may also include elements other than the aforementioned elements, or may not include a part of the aforementioned elements.

FIG. 3 is a block diagram showing the storage content of the storage unit 102 of the image forming apparatus 100. The storage unit 102 of the image forming apparatus 100 stores a control program 120 for controlling the operation of the image forming apparatus 100. Furthermore, the storage unit 102 stores a first file 131 that stores information on an operation button constituting an operation screen displayed on the operation panel 103, and a second file 132 that stores information on various types of guidance.

The first file 131 stores image data of each operation button (each operation button image) formed on the operation screen, identification information of the operation button, and position information of the operation button. The position information of the operation button includes information indicating a layer to which the operation button belongs, and information indicating the position of the operation button in the same layer.

The second file 132 stores image data of an emphasizing image for emphasizing an operation button (hereinafter, referred to as a guidance target operation button) that an operator is prompted to select during guidance, identification information of the emphasizing image, and position information of the emphasizing image for each of various types of guidance. The position information of the emphasizing image includes information indicating a layer to which the emphasizing image belongs, and information indicating the position of the emphasizing image in the same layer. The identification information of the emphasizing image stored in the second file 132 is associated with the identification information of the operation button stored in the first file 131, and if the position information of the operation button is changed, the position information of a corresponding emphasizing image is also changed according to the change in the position information of the operation button.

FIGS. 4A and 4B are diagrams each showing an example of an operation screen displayed on the operation panel 103 of the image forming apparatus 100. FIG. 4A is a diagram showing an example of a default operation screen and FIG. 4B is a diagram showing an example of a customized operation screen.

As shown in FIG. 4A, an operation screen 210 displayed on the operation panel 103 includes a plurality of operation buttons 211 to 213. In FIG. 4A, the operation screen 210 includes a "copy" button 211, a "scan" button 212, and a "FAX" button 213. The plurality of operation buttons 211 to 213 are formed on the operation screen 210 in accordance with the information of the first file 131.

Furthermore, as shown in FIG. 4B, the operation screen 210 is customized by an operator. In detail, the operation buttons 211 to 213 on the operation screen 210 are deleted, moved, or enlarged/reduced by the operator. Furthermore, an operation button is added onto the operation screen 210 by the operator. In FIG. 4B, the "FAX" button 213 is enlarged and the "copy" button 211 is moved.

Figure 6:
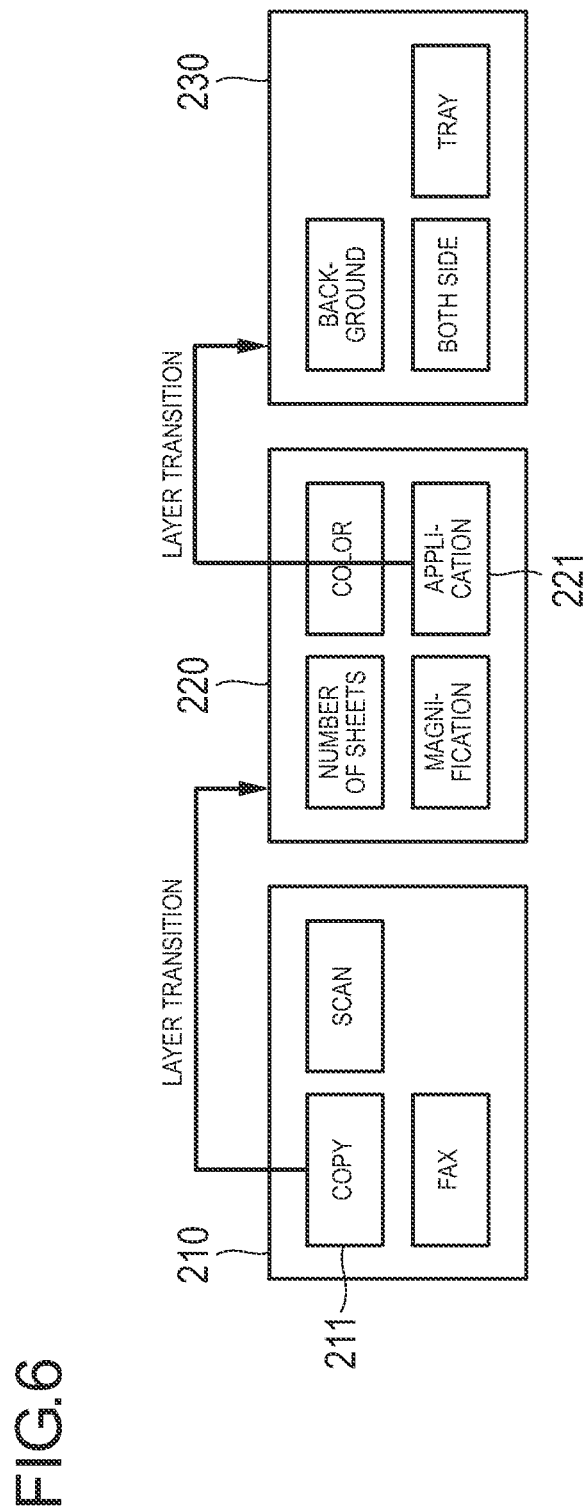
FIG. 6 is a diagram for explaining a layered structure of an operation screen.

FIGS. 5 and 6 are diagrams for explaining a layered structure of an operation screen. As shown in FIG. 5, an operation screen displayed on the operation panel 103 has a layered structure (a tree structure). On the operation panel 103, one operation screen of a plurality of operation screens having a layered structure is displayed. When an operation button on the operation screen is pressed, the operation screen is transitioned to a layer below one stage.

For example, as shown in FIG. 6, when the "copy" button 211 of the uppermost operation screen 210 is pressed, the operation screen displayed on the operation panel 103 is transitioned to an operation screen 220 below one stage. Furthermore, an "application" button 221 of the operation screen 220 is pressed, the operation screen displayed on the operation panel 103 is transitioned to an operation screen 230 below one stage.

In addition, as shown in FIG. 7, by customization of an operation screen, an operation button may be moved to an operation screen of another layer. In FIG. 7, a "magnification" button 222 on the operation screen 220 has been moved onto the lower operation screen 230.

FIG. 8 is a diagram for explaining a guidance function of the image forming apparatus 100. The image forming apparatus 100 has a guidance function of teaching a button operation required for setting predetermined image forming conditions to an operator. In addition, FIG. 8 shows guidance in the case of performing copy by designating a "magnification" and a "background".

As shown in FIG. 8, the image forming apparatus 100 superposes and displays an emphasizing image 300 on the guidance target operation button of a plurality of operation buttons constituting an operation screen, thereby prompting an operator to press the operation button. The emphasizing image 300 is formed on the operation screen in accordance with the information of the second file 132.

In FIG. 8, firstly, the image forming apparatus 100 superposes and displays an emphasizing image 300a on the "copy" button 211, thereby prompting the operator to press the "copy" button 211. Then, when the "copy" button 211 is pressed, the image forming apparatus 100 superposes and displays an emphasizing image 300b on the "magnification" button 222, thereby prompting the operator to press the "magnification" button 222 and designate a magnification. When the magnification is designated, the image forming apparatus 100 superposes and displays an emphasizing image 300c on the "application" button 221, thereby prompting the operator to press the "application" button 221. When the "application" button 221 is pressed, the image forming apparatus 100 superposes and displays an emphasizing image 300d on a "background" button 231, thereby prompting the operator to press the "background" button 231 and designate a background.

In addition, the control unit 101 of the image forming apparatus 100 executes the control program 120 stored in the storage unit 102, thereby serving as a recognizing unit, an update unit, and a checking unit. Herein, the recognizing unit recognizes that an operation button has been added or deleted with respect to an operation screen. The update unit updates the information of the second file 132 such that the content of guidance provided on the basis of the information of the second file 132 reflects the configuration of a plurality of operation screens after an operation button has been added or deleted. When deletion of an operation button has been instructed, the checking unit checks with an operator about the deletion instruction. Detail processing content of each unit will be described later.

In the image forming apparatus 100 configured as above, when an operation button has been added or deleted with respect to an operation screen by customization of the operation screen, the information of the second file 132, which is information on guidance, is updated. Hereinafter, with reference to FIG. 9A to FIG. 26, the operation of the image forming apparatus 100 for updating the information of the second file 132 in response to customization of an operation screen will be described.

Firstly, with reference to FIG. 9A to FIG. 10, customization, in which an operation button is added to an operation screen, will be described.

FIGS. 9A and 9B are diagrams showing an example of customization in which an operation button is added to an operation screen, and FIG. 10 is a diagram showing a layered structure of an operation screen after the customization. FIGS. 9A and 9B show the case in which an operation screen is newly created and a "magnification" button is moved onto the newly created operation screen by customization of an operation screen.

As shown in FIGS. 9A and 9B, when an operation screen 240 is newly created below one stage of the operation screen 220 and the "magnification" button 222 on the operation screen 220 is moved onto the operation screen 240, an "application 2" button 241 is added onto the operation screen 240. Furthermore, as shown in FIG. 10, the "background" button 231, a "both side" button 232, and a "tray" button 233 are moved to a layer below one stage. When the "application 2" button 241 on the operation screen 240 is pressed, an operation screen displayed on the operation panel 103 is moved to the operation screen 230 below one stage.

When an operation screen has been customized, the information of the first file 131 is updated so as to reflect the customization result. In detail, the position information of each operation button included in the first file 131 is updated. Furthermore, information on the "application 2" button 241 is newly generated and is added to the first file 131.

Thereafter, in response to the update of the information of the first file 131, the information of the second file 132 is also updated. Hereinafter, with reference to FIG. 11 to FIG. 18B, the operation of the image forming apparatus 100 for updating the information of the second file 132 will be described. In addition, in the present embodiment, the information of the second file 132 is updated in two steps. Furthermore, also in the following, the guidance in the case of performing the copy by designating the "magnification" and the "background" will be described as an example.

Figure 11:
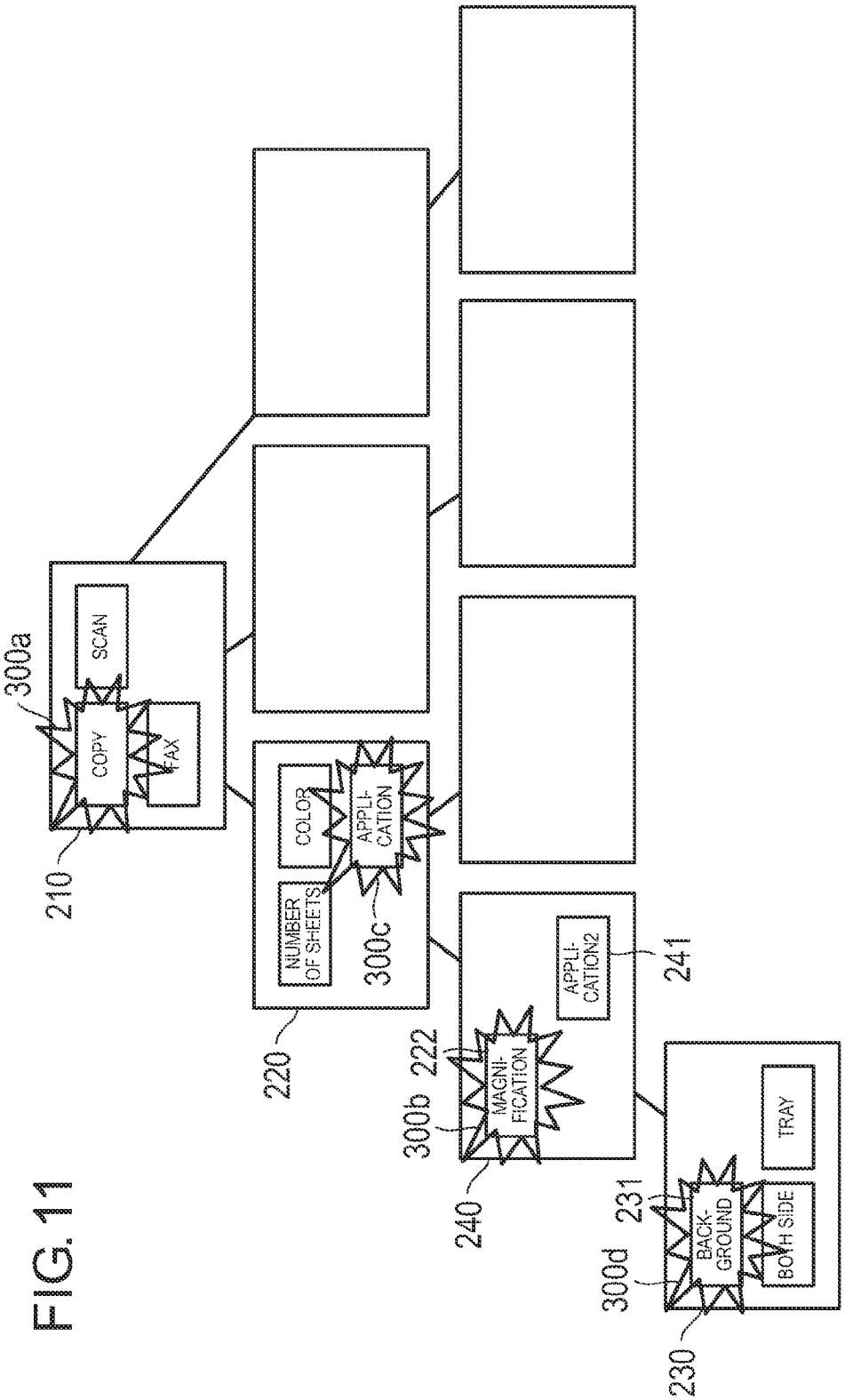
FIG. 11 is a diagram showing guidance provided by a second file after an update process of a first step.
Figure 12:
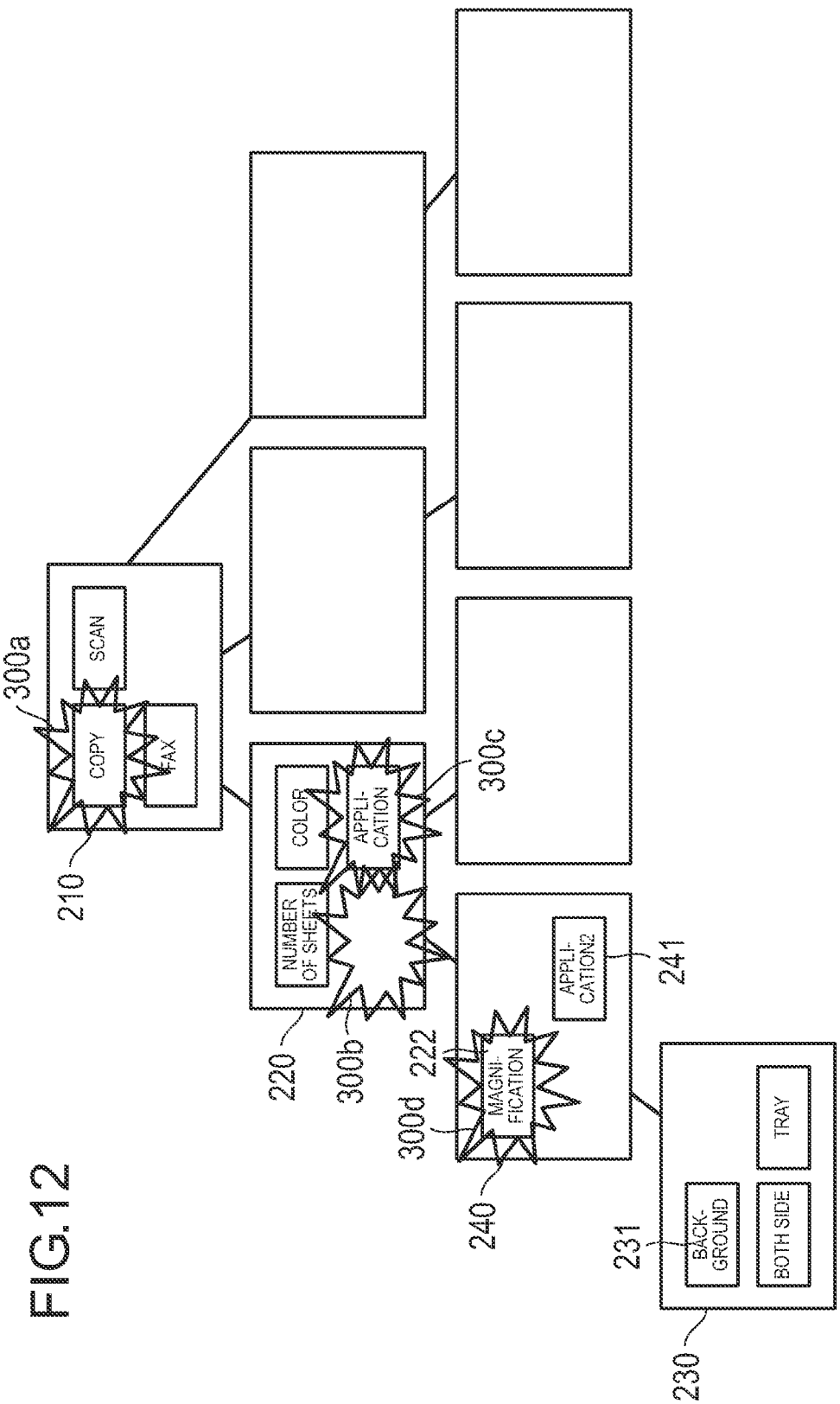
FIG. 12 is a diagram showing guidance provided by a second file before an update process.

FIG. 11 and FIG. 12 are diagrams for explaining an update process of a first step for updating the information of the second file 132. FIG. 11 is a diagram showing guidance provided by the second file 132 after the update process of the first step, and FIG. 12 is a comparison example and is a diagram showing guidance provided by the second file 132 before the update process.

As described above, the identification information of the emphasizing image 300 stored in the second file 132 is associated with the identification information of the operation button stored in the first file 131. Furthermore, when the position information of the operation button is changed by customization of an operation screen, the position information of a corresponding emphasizing image is overwritten by the position information of the operation button, so that the position information of the emphasizing image is also changed. Consequently, as shown in FIG. 11, according to the information of the second file 132 after the update process of the first step, in correspondence to the movement of the "magnification" button 222 to a layer below one stage, the emphasizing image 300b for emphasizing the "magnification" button 222 is also moved to the layer below one stage. Furthermore, in correspondence to the movement of the "background" button 231 to a layer below one stage, the emphasizing image 300d for emphasizing the "background" button 231 is also moved to a layer below one stage.

On the other hand, according to the information of the second file 132 before the update process, the position of the emphasizing image 300 is not changed from the position before customization. Consequently, as shown in FIG. 12, even though the "magnification" button 222 is moved to a layer below one stage by customization of an operation screen, the emphasizing image 300b for emphasizing the "magnification" button 222 is still positioned at the original layer. Similarly, even though the "background" button 231 is moved to a layer below one stage, the emphasizing image 300d for emphasizing the "background" button 231 is still positioned at the original layer.

Next, with reference to FIG. 13 to FIG. 18B, an update process of a second step for updating the information of the second file 132 will be described. The update process of the second step is performed, so that the "application 2" button 241 added to the operation screen 240 is emphasized.

Figure 13:
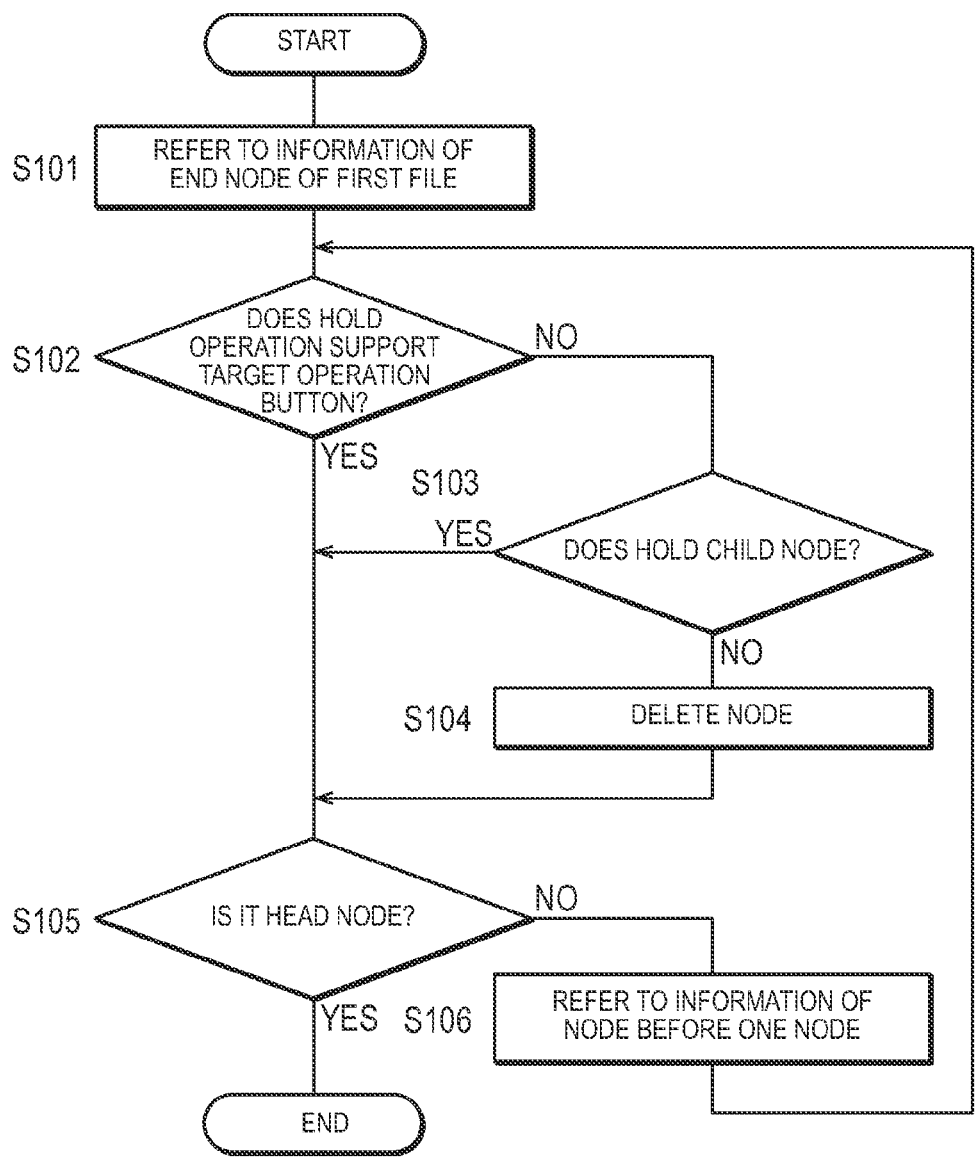
FIG. 13 is a flowchart showing the procedure of an operation screen extraction process.

FIG. 13 is a flowchart showing the procedure of an operation screen extraction process that is performed by the image forming apparatus 100. In addition, an algorithm shown by the flowchart of FIG. 13 is stored in the storage unit 102 of the image forming apparatus 100 as a program and is executed by the control unit 101.

Firstly, the image forming apparatus 100 refers to information of an end node of the first file 131 (step S101). In more detail, the image forming apparatus 100 refers to information of one operation screen belonging to the lowermost layer among a plurality of operation screens having a layered structure. For example, in the operation screen of the layered structure shown in FIG. 11, the image forming apparatus 100 refers to information of the operation screen 230 which is the lowermost operation screen.

Next, the image forming apparatus 100 determines whether a reference node holds an operation support target operation button (step S102). In more detail, the image forming apparatus 100 determines whether the guidance target operation button, which is emphasized by the emphasizing image 300, is included in the operation screen having the information currently referred to.

When it is determined that the reference node holds the operation support target operation button (step S102: YES), the image forming apparatus 100 proceeds to the process of step S105. On the other hand, when it is determined that the reference node does not hold the operation support target operation button (step S102: NO), the image forming apparatus 100 determines whether the reference node holds a child node (step S103). In more detail, the image forming apparatus 100 determines whether there is another operation screen below the operation screen having the information currently referred to.

When it is determined that the reference node holds the child node (step S103: YES), the image forming apparatus 100 proceeds to the process of step S105. On the other hand, when it is determined that the reference node does not hold the child node (step S103: NO), the image forming apparatus 100 deletes the reference node (step S104). In more detail, the image forming apparatus 100 deletes the operation screen having the information currently referred to because the operation screen having the information currently referred to does not include the guidance target operation button and does not have a lower operation screen.

Next, the image forming apparatus 100 determines whether the reference node is a head node (step S105). In more detail, the image forming apparatus 100 determines whether the operation screen having the information currently referred to is the uppermost operation screen (for example, the operation screen 210) among the plurality of operation screens having a layered structure.

When it is determined that the reference node is not the head node (step S105: NO), the image forming apparatus 100 refers to information of a node before one node (step S106) and returns to the process of step S102. In more detail, the image forming apparatus 100 refers to information of an operation screen (an operation screen above one stage when all types of information of an operation screen of the same layer has been completely referred to) adjacent to the operation screen having the information currently referred to in the same layer among the plurality of operation screens having a layered structure, and returns to the process of step S102.

On the other hand, in the process shown in step S105, when it is determined that the reference node is the head node (step S105: YES), the image forming apparatus 100 ends the procedure.

Figure 14:
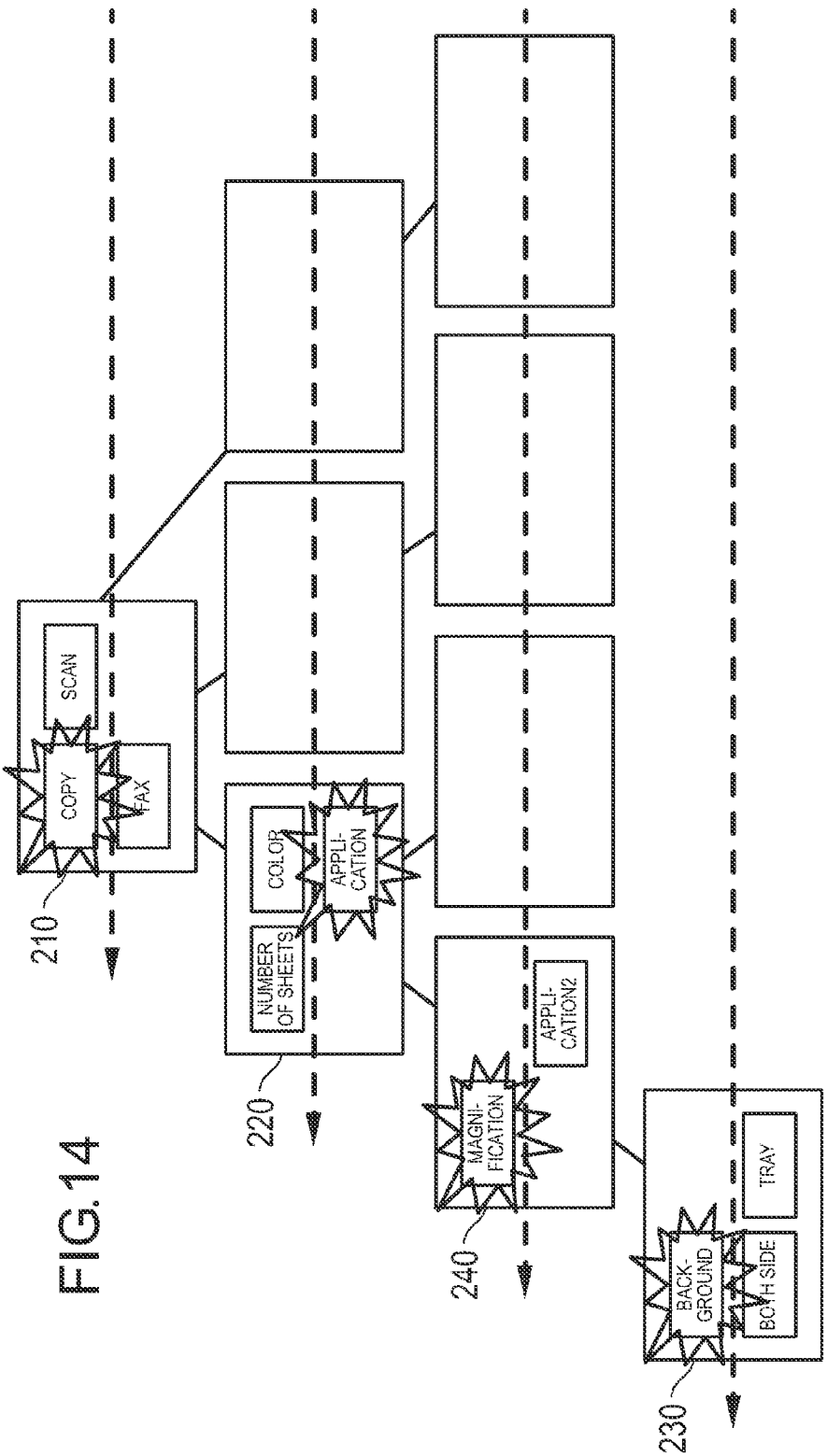
FIG. 14 is a diagram for explaining an operation screen extraction process.
Figure 15:
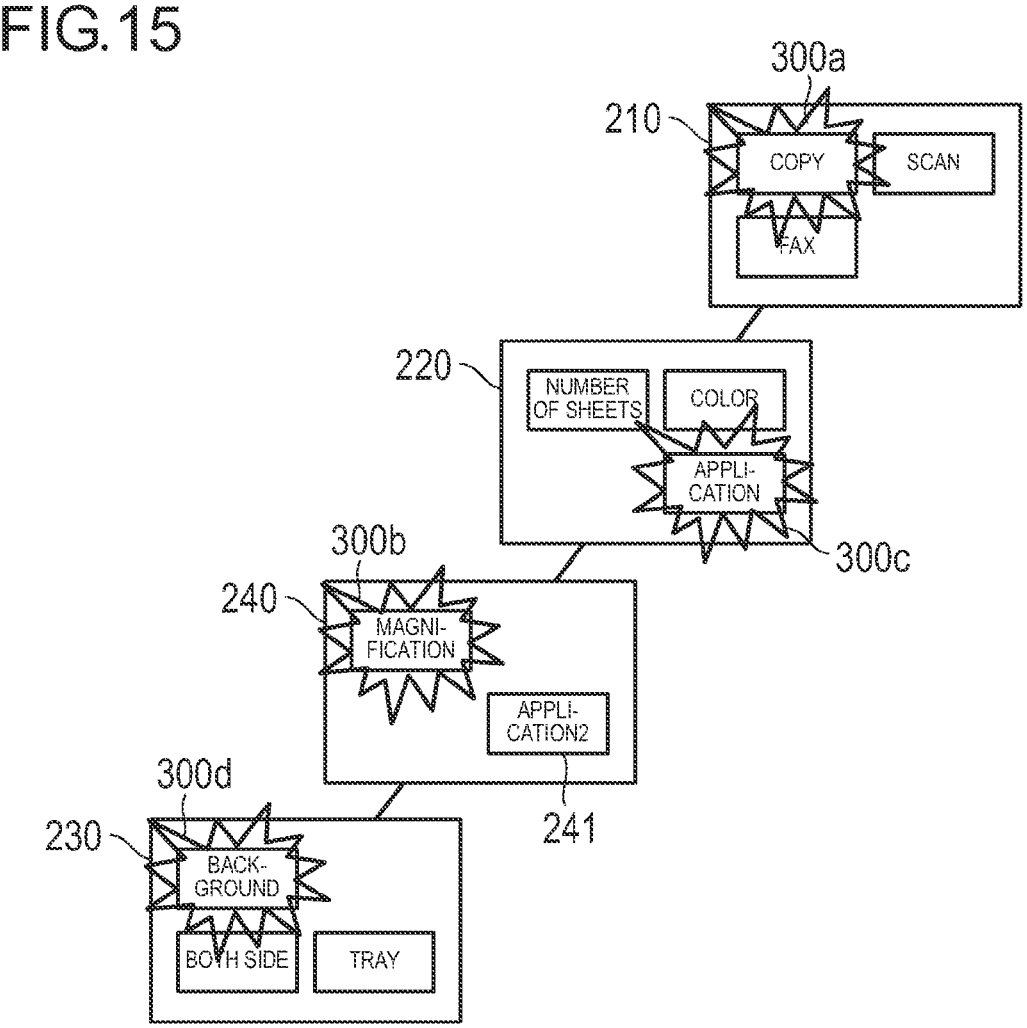
FIG. 15 is a diagram for explaining an operation screen extraction process.

As described above, according to the procedure of the flowchart shown in FIG. 13, for example, as shown in FIG. 14, information of operation screens is sequentially referred to and an operation screen having no relation to the content of guidance is deleted toward the uppermost operation screen 210 from the lowermost operation screen 230 along with arrows in FIG. 14. As a consequence, as shown in FIG. 15, a series of operation screens 210, 220, 230, and 240 corresponding to predetermined guidance are extracted from the plurality of operation screens having a layered structure.

Figure 16:
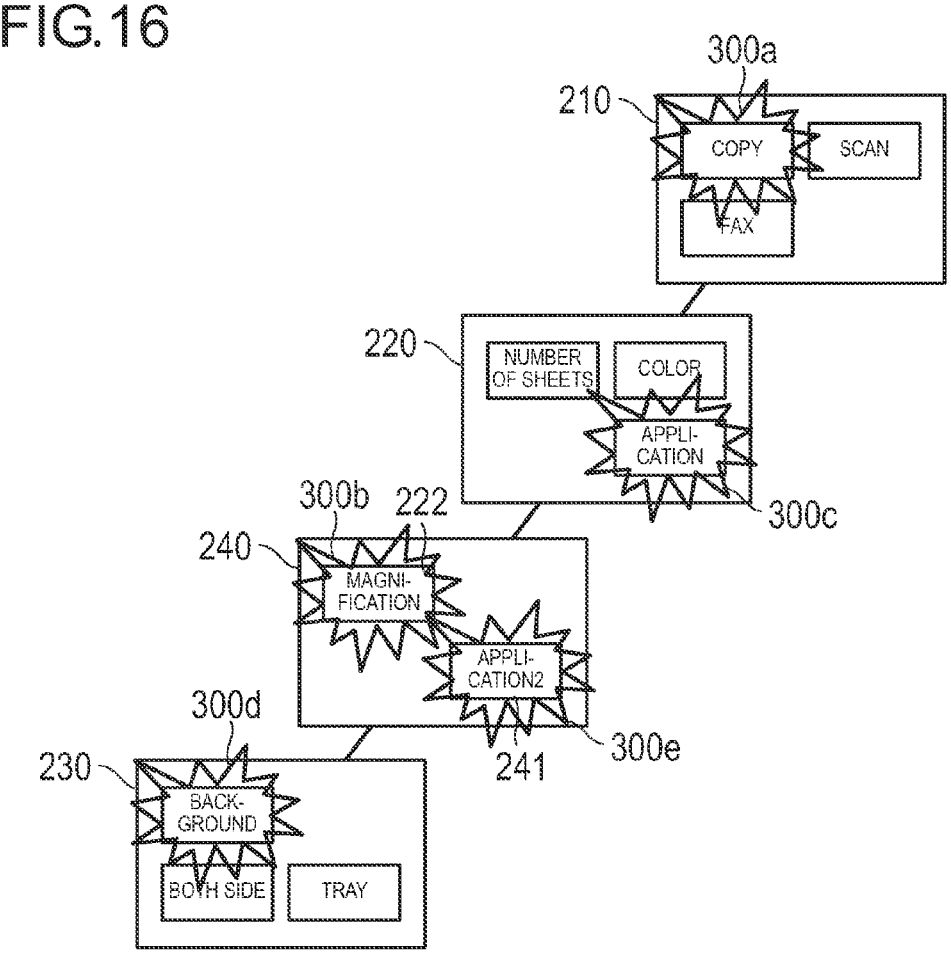
FIG. 16 is a diagram for explaining an update process of a second step.

Then, the image forming apparatus 100 recognizes the "application 2" button 241, which is an operation button to be transitioned to a lower operation screen, as an operation button to be emphasized among operation buttons constituting the series of operation screens 210, 220, 230, and 240. Furthermore, the image forming apparatus 100 newly generates information of an emphasizing image corresponding to the "application 2" button 241, and adds the information to the second file 132. As a consequence, as shown in FIGS. 16 and 17, an emphasizing image 300e is displayed on the "application 2" button 241, so that the "application 2" button 241 is emphasized.

Figure 18A:
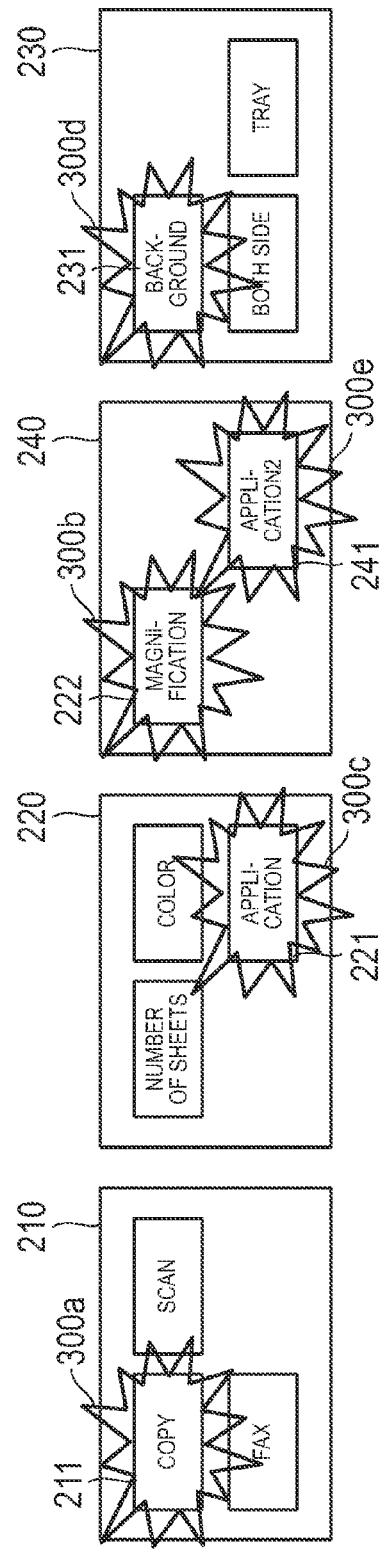
FIGS. 18A and 18B are diagrams showing guidance before and after an update process of a second step.
Figure 18B:
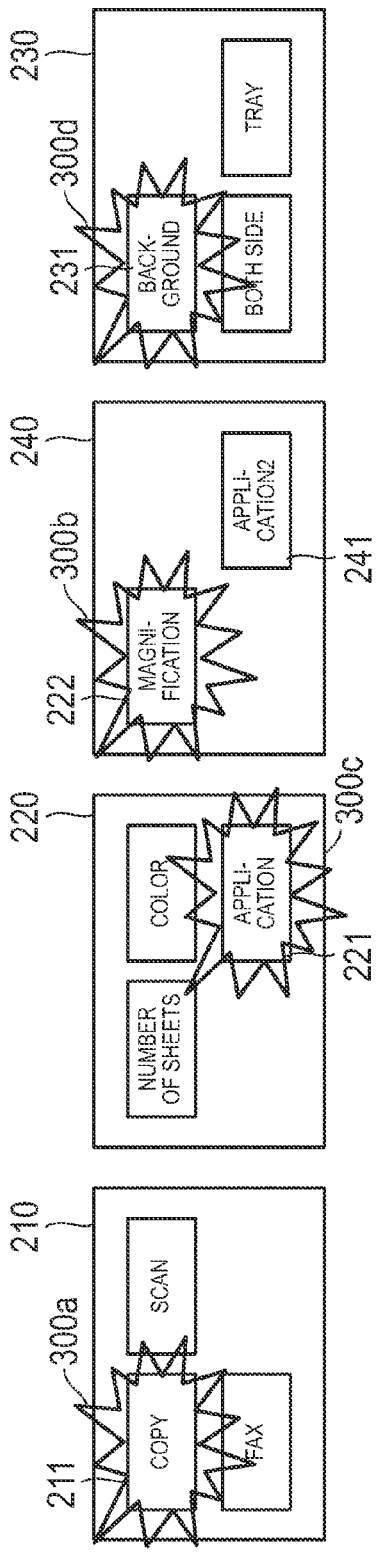

FIGS. 18A and 18B are diagrams showing guidance before and after the update process of the second step. FIG. 18A is a diagram showing guidance after the update process of the second step and FIG. 18B is a diagram showing guidance before the update process of the second step.

As shown in FIG. 18A, in the guidance after the update process of the second step, the "application 2" button 241 is emphasized by the emphasizing image 300e. Therefore, the image forming apparatus 100 can prompt an operator to press the "application 2" button 241, thereby providing correct guidance.

In detail, firstly, the image forming apparatus 100 superposes and displays the emphasizing image 300a on the "copy" button 211, thereby prompting the operator to press the "copy" button 211. Then, when the "copy" button 211 is pressed, the image forming apparatus 100 superposes and displays the emphasizing image 300c on the "application" button 221, thereby prompting the operator to press the "application" button 221. When the "application" button 221 is pressed, the image forming apparatus 100 superposes and displays the emphasizing image 300b on the "magnification" button 222, thereby prompting the operator to press the "magnification" button 222 and designate a magnification. When the magnification is designated, the image forming apparatus 100 superposes and displays the emphasizing image 300e on the "application 2" button 241, thereby prompting the operator to press the "application 2" button 241. When the "application 2" button 241 is pressed, the image forming apparatus 100 superposes and displays the emphasizing image 300d on the "background" button 231, thereby prompting the operator to press the "background" button 231 and designate a background.

On the other hand, as shown in FIG. 18B, in the guidance before the update process of the second step, the "application 2" button 241 is not emphasized. Therefore, according to the guidance before the update process of the second step, since the image forming apparatus 100 is not able to prompt the operator to press the "application 2" button 241, it is not possible to provide correct guidance.

As described above, according to the present embodiment, when an operation button has been added to an operation screen having a layered structure, the information of the second file 132 is updated in response to a relation between the operation screen 240, to which the operation button has been added, and the lower operation screen 230. In this way, when an operation button has been added to an operation screen, consistency between the configurations of a plurality of operation screens having a layered structure and the content of guidance is maintained, so that it is possible to provide correct guidance.

Next, with reference to FIG. 19A to FIG. 20B, another example in which an operation button is added to an operation screen will be described.

Figure 19A:
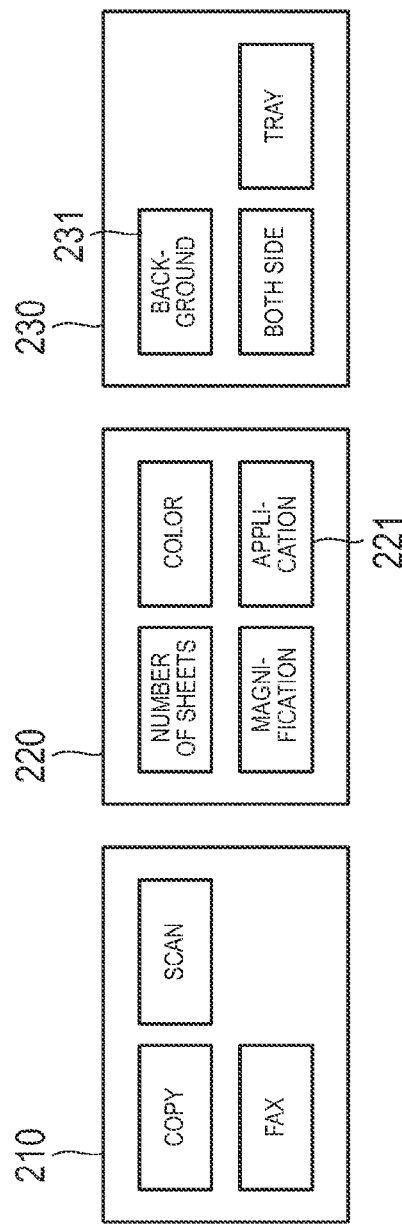
FIGS. 19A and 19B are diagrams showing another example of customization in which an operation button is added.
Figure 19B:
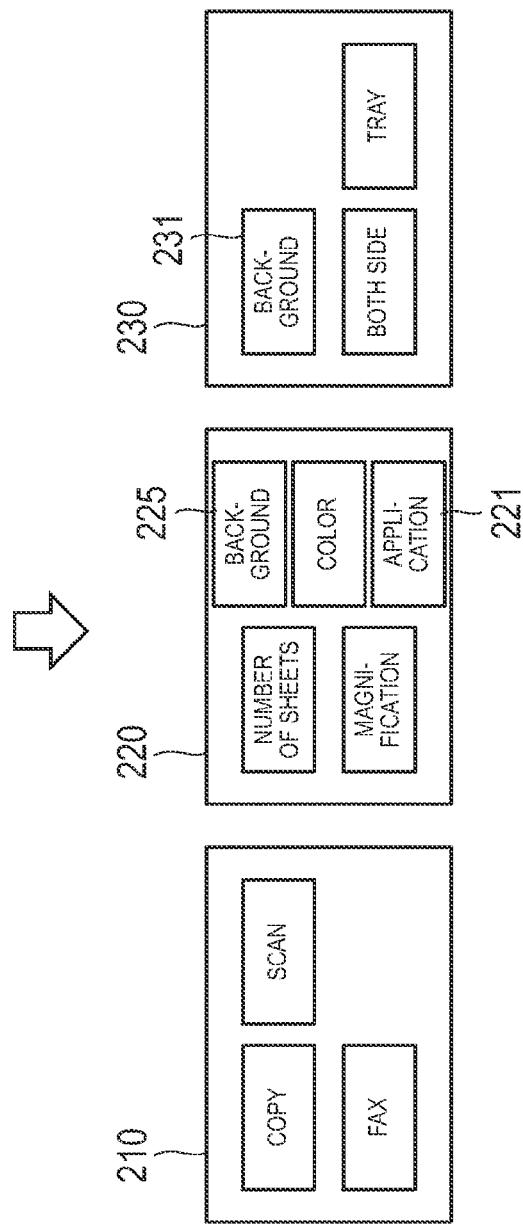

FIGS. 19A and 19B are diagrams showing another example of customization in which an operation button is added to an operation screen. FIG. 19A is a diagram showing an operation screen before customization, and FIG. 19B is a diagram showing an operation screen after the customization. In addition, also in the following, the guidance in the case of performing the copy by designating the "magnification" and the "background" will be described as an example.

As shown in FIGS. 19A and 19B, in another example of customization, a "background" button 225 is newly added onto the operation screen 220 separately from the "background" button 231 on the operation screen 230.

When the "background" button 225 has been newly added, the image forming apparatus 100 updates the information of the second file 132 in response to a relation between the operation screen 220 and the operation screen 230. In detail, in consideration of the fact that the operation screen 220 is positioned higher than the operation screen 230, the image forming apparatus 100 updates the information of the second file 132 such that the emphasizing image 300f is displayed on the "background" button 225 added to the operation screen 220 and the emphasizing image 300d is not displayed on the "background" button 231 as shown in FIGS. 20A and 20B. In addition, the image forming apparatus 100 updates the information of the second file 132 such that the emphasizing image 300c is not displayed on the "application" button 221.

According to such a configuration, it is possible to improve the convenience of an operator while providing correct guidance.

Next, with reference to FIG. 21 to FIG. 26, the operation of the image forming apparatus 100 when an operation button is deleted from an operation screen will be described. When the deletion of an operation button is instructed by an operator, the image forming apparatus 100 performs alarm display for checking the deletion instruction.

Figure 21:
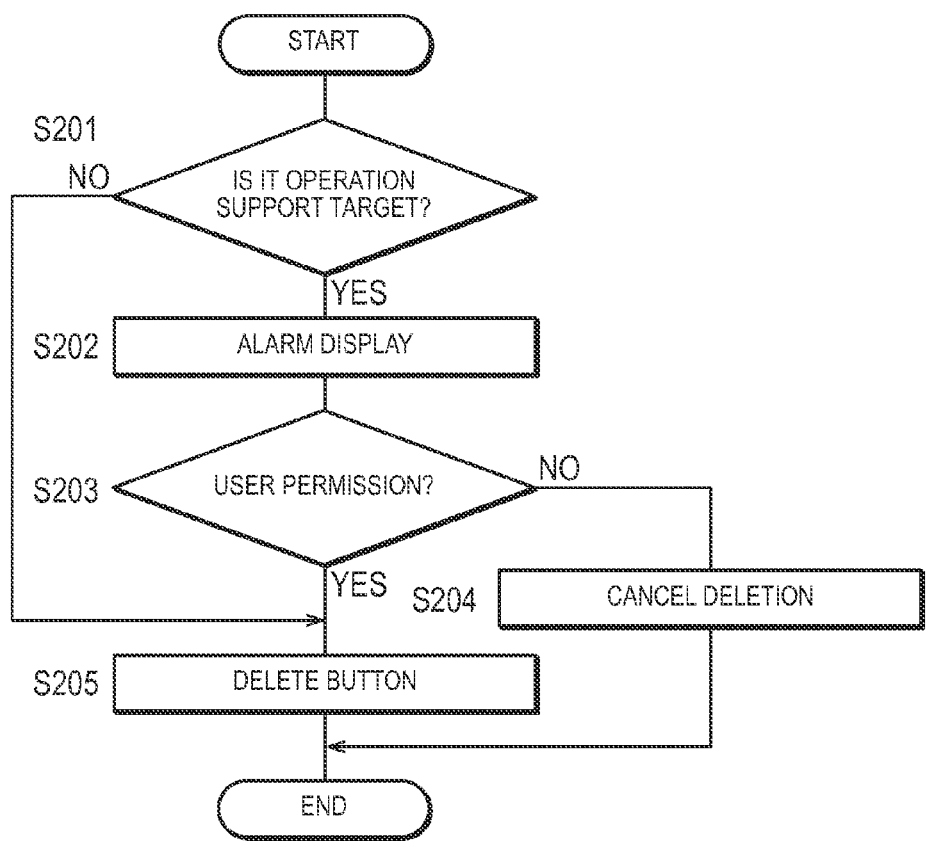
FIG. 21 is a flowchart showing the procedure of a checking process.

FIG. 21 is a flowchart showing the procedure of a checking process that is performed by the image forming apparatus 100. In addition, an algorithm shown by the flowchart of FIG. 21 is stored in the storage unit 102 of the image forming apparatus 100 as a program and is executed by the control unit 101.

Firstly, the image forming apparatus 100 determines whether an operation button to be deleted is an operation support target (step S201). In more detail, the image forming apparatus 100 determines whether an operation button instructed to be deleted by an operator is the guidance target operation button to be emphasized at the time of predetermined guidance.

When it is determined that the operation button to be deleted is not the operation support target (step S201: NO), the image forming apparatus 100 deletes the operation button (step S205) and ends the procedure. On the other hand, when it is determined that the operation button to be deleted is the operation support target (step S201: YES), the image forming apparatus 100 performs alarm display (step S202). In more detail, the image forming apparatus 100 displays an alarm screen (not illustrated) on the operation panel 103, and checks with an operator whether to delete the operation button.

Next, the image forming apparatus 100 determines whether the operator has permitted (step S203). In more detail, the image forming apparatus 100 determines whether the operator has permitted to delete the operation button with respect to the alarm display performed in the process shown in step S202.

When it is determined that the operator has not permitted (step S203: NO), the image forming apparatus 100 cancels the deletion of the operation button (step S204) and ends the procedure. On the other hand, when it is determined that the operator has permitted (step S203: YES), the image forming apparatus 100 deletes the operation button (step S205) and ends the procedure.

As described above, according to the procedure of the flowchart shown in FIG. 21, when the deletion of an operation button has been instructed, the deletion instruction is checked by an operator. According to such a configuration, at the time of customization of an operation screen, it is possible to prevent an operator from deleting an operation button required in performing guidance. In addition, when the operation button required in performing guidance has been deleted, the content of the guidance is changed in order to maintain consistency between the configuration of the operation screen and the content of the guidance.

FIGS. 22A and 22B are diagrams showing an example of customization in which an operation button is deleted from an operation screen. FIG. 22A is a diagram showing an operation screen before customization and FIG. 22B is a diagram showing an operation screen after the customization. In addition, also in the following, the guidance in the case of performing the copy by designating the "magnification" and the "background" will be described as an example.

As shown in FIGS. 22A and 22B, in an example of customization in which an operation button is deleted, the "background" button 231 on the operation screen 230 is deleted. When the "background" button 231 has been deleted, the image forming apparatus 100 updates the information of the second file 132 such that an emphasizing image is not displayed at a position in which the "background" button 231 has existed. Furthermore, in consideration of a relation between the operation screen 220 and the operation screen 230, the image forming apparatus 100 updates the information of the second file 132 such that an emphasizing image is not displayed on the "application" button 221 of the operation screen 220.

Figure 23A:
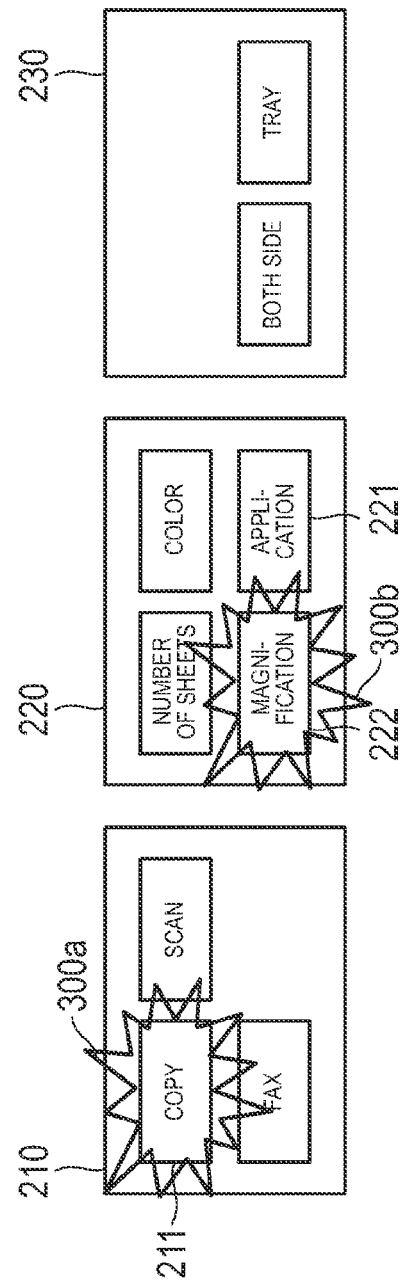
FIGS. 23A and 23B are diagrams showing guidance provided by a second file.
Figure 23B:
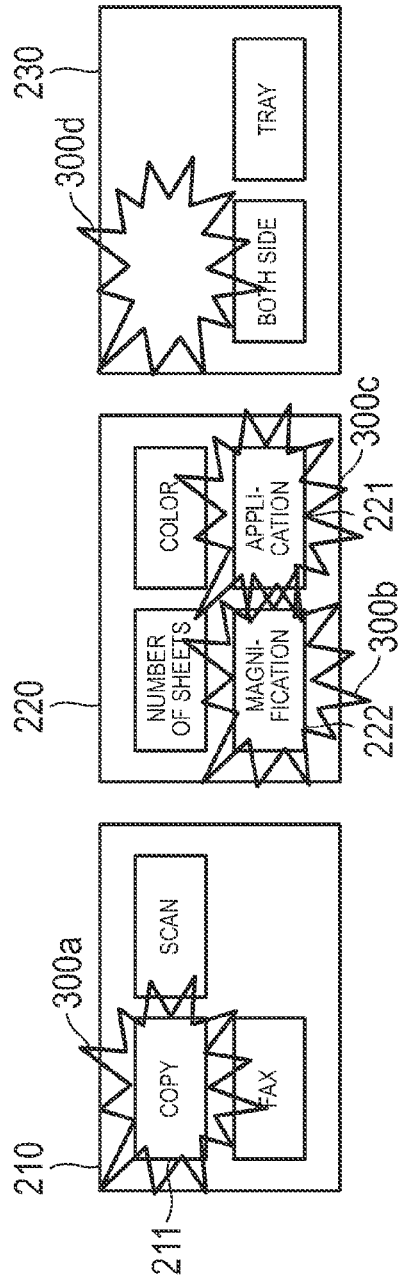

FIG. 23A is a diagram showing guidance provided by the second file 132 after the update process, and FIG. 23B is a comparison example and is a diagram showing guidance provided by the second file 132 before the update process.

As shown in FIG. 23 A, according to the information of the second file 132 after the update process, the emphasizing images 300a and 300b are respectively displayed on the "copy" button 211 and the "magnification" button 222, and the emphasizing image 300d is not displayed at the position in which the "background" button 231 has existed. Moreover, the emphasizing image 300c is not displayed also on the "application" button 221.

On the other hand, as shown in FIG. 23B, according to the information of the second file 132 before the update process, the emphasizing image 300d is displayed at the position in which the "background" button 231 has existed, and the emphasizing image 300c is displayed also on the "application" button 221.

As described above, according to the present embodiment, when an operation button has been deleted, the information of the second file 132 is updated in response to a relation between the operation screen 230 from which the operation button has been deleted and the operation screen 220 positioned higher than the operation screen 230. In this way, when an operation button has been deleted from an operation screen, consistency between the configurations of a plurality of operation screens having a layered structure and the content of guidance is maintained, so that it is possible to provide correct guidance.

Next, with reference to FIG. 24A to FIG. 25B, another example in which an operation button is deleted from an operation screen will be described.

FIG. 24A is a diagram showing an operation screen before customization and FIG. 24B is a diagram showing an operation screen after the customization.

As shown in FIGS. 24A and 24B, in another example of customization in which an operation button is deleted, the "magnification" button 222 on the operation screen 220 is deleted. When the "magnification" button 222 has been deleted, the image forming apparatus 100 updates the information of the second file 132 such that an emphasizing image is not displayed at a position in which the "magnification" button 222 has existed.

FIG. 25A is a diagram showing guidance provided by the second file 132 after the update process, and FIG. 25B is a comparison example and is a diagram showing guidance provided by the second file 132 before the update process.

As shown in FIG. 25A, according to the information of the second file 132 after the update process, the emphasizing images 300a, 300c, and 300d are respectively displayed on the "copy" button 211, the "application" button 221, and the "background" button 231, and the emphasizing image 300b is not displayed at the position in which the "magnification" button 222 has existed. On the other hand, as shown in FIG. 25B, according to the information of the second file 132 before the update process, the emphasizing image 300b is displayed at the position in which the "magnification" button 222 has existed.

(Modification)

In addition, in the aforementioned embodiment, when the deletion of a guidance target operation button has been instructed, the alarm display is necessarily performed. However, the alarm display may not be necessarily performed.

FIG. 26 is a flowchart showing the procedure of a checking process according to a modification. In the checking process according to the modification, alarm display is performed in response to an operation history of an operation button. The operation history of the operation button, for example, is the number of operations of the operation button, and is stored in the first file 131.

Since the process of step S301 of FIG. 26 is similar to that of step S201 of FIG. 21, a description thereof will be omitted.

In the process shown in step S301, when it is determined that the operation button to be deleted is the operation support target (step S301: YES), the image forming apparatus 100 determines whether the number of times of use exceeds a threshold value (step S302). In more detail, the image forming apparatus 100 determines whether the number of operations of the operation button exceeds a predetermined threshold value with reference to an operation history of the operation button to be deleted.

When it is determined that the number of times of use does not exceed the threshold value (step S302: NO), the image forming apparatus 100 deletes the operation button (step S306) and ends the procedure. On the other hand, when it is determined that the number of times of use exceeds the threshold value (step S302: YES), the image forming apparatus 100 performs alarm display (step S303). Since processes after step S303 are similar to those after step S202 of FIG. 21, a description thereof will be omitted.

As described above, according to the procedure of the flowchart shown in FIG. 26, with the deletion of an operation button, an operation history of the operation button is referred to, and in response to the operation history, it is determined whether to perform alarm display. Furthermore, when the number of operations of the operation button exceeds a predetermined threshold value, the fact indicating the deletion of the operation button is checked by an operator. According to such a configuration, at the time of customization, it is possible to solve inconvenience of alarm display performed whenever a deletion operation is performed.

In addition, the control unit 101 of the image forming apparatus 100 serves as a determination unit and a changing unit. When the deletion of an operation button has been instructed, the determination unit determines whether to check with an operator about the deletion instruction in response to an operation history of the operation button. The changing unit changes a threshold value which is compared with the operation history. The operator can change the threshold value, which serves as a reference when the alarm display is performed, through the operation panel 103 of the image forming apparatus 100.

The present invention is not limited only to the aforementioned embodiment, and can be variously modified within the scope of the claims.

For example, in the aforementioned embodiment, an emphasizing image is superposed and displayed on an operation button, so that the guidance target operation button is emphasized. However, a method for emphasizing the guidance target operation button is not limited to the method for superposing and displaying the emphasizing image, and may include a method for changing a frame line color of the operation button, or inverting and displaying the operation button, or blinking the operation button.

Furthermore, in the aforementioned embodiment, the guidance target operation button is emphasized, thereby prompting an operator to select the operation button. However, the guidance of prompting an operator to select the operation button is not limited to the guidance of emphasizing the operation button, and may include sound guidance of prompting an operator to select the operation button by sound.

Furthermore, in the aforementioned embodiment, the case in which, guidance of sequentially emphasizing a plurality of operation buttons to teach a button operation to an operator is performed, has been described as an example. However, the present invention can also be applied to guidance of collectively reducing and displaying an operation procedure of a plurality of operation buttons to teach a button operation to an operator.

The units and the method for performing various processes in the image forming apparatus according to the aforementioned embodiment can also be implemented by any one of a dedicated hardware circuit and a programmed computer. The aforementioned program, for example, may also be provided by a computer readable recording medium such as a flexible disk and CD-ROM, or may also be provided on-line via a network such as Internet. In this case, the program stored in the computer readable recording medium is normally transmitted to and stored in a storage unit such as a hard disk. Furthermore, the aforementioned program may also be provided as independent application software or may also be integrated in the software of an image forming apparatus as one function of the image forming apparatus.

What is claimed is:
1. A display apparatus that switches and displays a plurality of operation screens each including an operation object selectable by an operator and having a layered structure, comprising:

a display configured to display one operation screen of the plurality of operation screens;
a memory configured to store first information on an operation object and second information on guidance, the guidance emphasizing the operation object so as to change the appearance of the operation object on the display in order to prompt an operator to select the operation object; and
a processor configured to recognize that an operation object is added or deleted and, in case the processor recognizes that the operation object is added or deleted, to update the second information in response to a relation between an operation screen to/from which the operation object is added or deleted and an operation screen positioned higher or lower than the operation screen such that content of the guidance reflects configurations of the plurality of operation screens after addition or deletion of the operation object after the processor extracts a series of operation screens corresponding to the guidance, the series of operation screens including the operation screen to/from which the operation object is added or deleted from the plurality of operation screens.

2. The display apparatus as claimed in claim 1, wherein the processor extracts the series of operation screens by deleting an operation screen having no relation to the content of the guidance sequentially from a lowermost operation screen of the plurality of operation screens having a layered structure.

3. The display apparatus as claimed in claim 1, wherein the processor is configured to prompt the operator to check, when deletion of an operation object, which the operator is prompted to select in the guidance, is instructed by the operator.

4. The display apparatus as claimed in claim 3, wherein the processor is configured to determine whether to prompt the operator to check in response to an operation history of the operation object.

5. The display apparatus as claimed in claim 4, wherein the processor determines whether to prompt the operator to check, by comparing the operation history with a predetermined threshold value, and wherein the processor is configured to change the threshold value.

6. The display apparatus as claimed in claim 1, wherein the guidance is a mark for emphasizing the operation object.

7. The display apparatus as claimed in claim 1, wherein content of the display is maintained without being changed when the guidance is operated by the operator, and is changed when the operation object is operated by the operator.

8. The display apparatus as claimed in claim 1, wherein the memory stores a series of emphasizing operation objects necessary for setting predetermined conditions through the plurality of operation screens having the layered structure, and
the processor determines whether at least one of the series of emphasizing operation objects is included in an operation screen positioned lower than a predetermined operation screen,
and adds the guidance to the emphasizing operation object included in the predetermined operation screen to be displayed on the display, when it is determined that at least one of the series of emphasizing operation objects is included in the operation screen positioned lower than the predetermined operation screen.

9. The display apparatus as claimed in claim 1, wherein
the plurality of operation screens includes a first operation screen and a second operation screen positioned lower than the first operation screen,
the processor determines whether a first operation object in the first screen is the same as a second operation object in the second operation screen, and
when the processor determines that the first and second operation objects are the same, the processor adds the guidance to the first operation object and does not add the guidance to the second operation object.

10. A display method used in a display apparatus that switches and displays a plurality of operation screens each including an operation object selectable by an operator and having a layered structure, comprising the steps of:
storing first information on an operation object and second information on guidance, the guidance emphasizing the operation object so as to change the appearance of the operation object on the display in order to prompt an operator to select the operation object;
recognizing that an operation object is added or deleted; and
in case it is recognized that the operation object is added or deleted, updating the second information in response to a relation between an operation screen to/from which the operation object is added or deleted and an operation screen positioned higher or lower than the operation screen such that content of the guidance reflects configurations of the plurality of operation screens after addition or deletion of the operation object after extracting a series of operation screens corresponding to the guidance, the series of operation screens including the operation screen to/from which the operation object is added or deleted from the plurality of operation screens.

11. The method of claim 10, wherein the guidance is a mark for emphasizing the operation object.

12. The method of claim 10, wherein
content of the display is maintained without being changed when the guidance is operated by the operator, and is changed when the operation object is operated by the operator.

13. The method of claim 10, wherein
the memory stores a series of emphasizing operation objects necessary for setting predetermined conditions through the plurality of operation screens having the layered structure, and
the processor determines whether at least one of the series of emphasizing operation objects is included in an operation screen positioned lower than a predetermined operation screen,
and adds the guidance to the emphasizing operation object included in the predetermined operation screen to be displayed on the display, when it is determined that at least one of the series of emphasizing operation objects is included in the operation screen positioned lower than the predetermined operation screen.

14. The method of claim 10, wherein the plurality of operation screens includes a first operation screen and a second operation screen positioned lower than the first operation screen, and the method further comprises:
determining whether a first operation object in the first screen is the same as a second operation object in the second operation screen, and
upon determining that the first and second operation objects are the same, adding the guidance to the first operation object and not adding the guidance to the second operation object.

15. A non-transitory computer readable recording medium stored with a display program executed in a display apparatus that switches and displays a plurality of operation screens each including an operation object selectable by an operator and having a layered structure, the program causing the display apparatus to execute a process comprising the steps of:
storing first information on an operation object and second information on guidance, the guidance emphasizing the operation object so as to change the appearance of the operation object on the display in order to prompt an operator to select the operation object;
recognizing that an operation object is added or deleted; and
in case it is recognized that the operation object is added or deleted, updating the second information in response to a relation between an operation screen to/from which the operation object is added or deleted and an operation screen positioned higher or lower than the operation screen such that content of the guidance reflects configurations of the plurality of operation screens after addition or deletion of the operation object after extracting a series of operation screens corresponding to the guidance, the series of operation screens including the operation screen to/from which the operation object is added or deleted from the plurality of operation screens.

16. The non-transitory computer readable recording medium of claim 15, wherein the guidance is a mark for emphasizing the operation object.

17. The non-transitory computer readable recording medium of claim 15, wherein
content of the display is maintained without being changed when the guidance is operated by the operator, and is changed when the operation object is operated by the operator.

18. The non-transitory computer readable recording medium of claim 15, wherein
the memory stores a series of emphasizing operation objects necessary for setting predetermined conditions through the plurality of operation screens having the layered structure, and
the processor determines whether at least one of the series of emphasizing operation objects is included in an operation screen positioned lower than a predetermined operation screen,
and adds the guidance to the emphasizing operation object included in the predetermined operation screen to be displayed on the display, when it is determined that at least one of the series of emphasizing operation objects is included in the operation screen positioned lower than the predetermined operation screen.

19. The non-transitory computer readable recording medium of claim 15, wherein the plurality of operation screens includes a first operation screen and a second operation screen positioned lower than the first operation screen, and the process executed by the display apparatus further includes:
determining whether a first operation object in the first screen is the same as a second operation object in the second operation screen, and upon determining that the first and second operation objects are the same, adding the guidance to the first operation object and not adding the guidance to the second operation object.

* * * * *